(12) United States Patent
Yu et al.

(10) Patent No.: US 11,674,929 B2
(45) Date of Patent: Jun. 13, 2023

(54) LIFTING APPARATUS AND ULTRASONIC INSPECTION SYSTEM

(71) Applicant: General Electric Company, Schenectady, NY (US)

(72) Inventors: Xun Yu, Shanghai (CN); Aixen Chen, Shanghai (CN)

(73) Assignee: General Electric Company, Schenectady, NY (US)

( * ) Notice: Subject to any disclaimer, the term of this patent is extended or adjusted under 35 U.S.C. 154(b) by 1059 days.

(21) Appl. No.: 15/753,245

(22) PCT Filed: Aug. 19, 2015

(86) PCT No.: PCT/CN2015/087538
§ 371 (c)(1),
(2) Date: Feb. 16, 2018

(87) PCT Pub. No.: WO2017/028278
PCT Pub. Date: Feb. 23, 2017

(65) Prior Publication Data
US 2018/0246068 A1 Aug. 30, 2018

(51) Int. Cl.
*G01N 29/22* (2006.01)
*B66F 7/02* (2006.01)
(Continued)

(52) U.S. Cl.
CPC ............ *G01N 29/225* (2013.01); *B66F 3/08* (2013.01); *B66F 3/46* (2013.01); *B66F 7/025* (2013.01);
(Continued)

(58) Field of Classification Search
CPC ...... B66F 3/08; B66F 3/00; B66F 7/02; B66F 7/025; G01N 26/225; G01N 29/24;
(Continued)

(56) References Cited

U.S. PATENT DOCUMENTS

| 3,291,260 A | 12/1966 | Frederick et al. |
| 4,167,121 A | 9/1979 | Mauch |

(Continued)

FOREIGN PATENT DOCUMENTS

| CN | 1492834 A | 4/2004 |
| CN | 101200272 A | 6/2008 |

(Continued)

OTHER PUBLICATIONS

International Search Report and Written Opinion issued in connection with corresponding PCT Application No. PCT/CN2015/087538 dated May 19, 2016.

(Continued)

*Primary Examiner* — Stephen D Meier
*Assistant Examiner* — Rose M Miller
(74) *Attorney, Agent, or Firm* — Mintz Levin Cohn Ferris Glovsky and Popeo, P.C.

(57) ABSTRACT

A lifting apparatus (100) is disclosed. The lifting apparatus (100) includes a power driving module (1) for providing a driving force, a plurality of lifting modules (21, 22, 23) for raising and lowering a supporting module (4) upon action of the driving force, and a transmission module (3) located under the supporting module (4) for transmitting the driving force to at least one of the plurality of lifting modules (21, 22, 23). An ultrasonic inspection system is also disclosed, which includes at least one ultrasonic probe and the lifting apparatus (100) for raising and lowering a workpiece (200)

(Continued)

at least partly immersed in a liquid to a suitable position for inspection of the workpiece (200) by the at least one ultrasonic probe.

24 Claims, 20 Drawing Sheets

(51) Int. Cl.
  *B66F 3/08* (2006.01)
  *B66F 3/46* (2006.01)
  *G01N 29/28* (2006.01)
  *G01N 29/04* (2006.01)

(52) U.S. Cl.
  CPC ........... *G01N 29/04* (2013.01); *G01N 29/043* (2013.01); *G01N 29/28* (2013.01)

(58) Field of Classification Search
  CPC ...... G01N 29/04; G01N 29/043; G01N 29/28; G01N 29/225
  USPC .......... 73/571, 618, 619, 620, 632, 633, 634
  See application file for complete search history.

(56) References Cited

U.S. PATENT DOCUMENTS

| | | | | |
|---|---|---|---|---|
| 4,511,110 A | * | 4/1985 | Moller | ................. B66F 7/0658 |
| | | | | 108/147 |
| 2017/0010241 A1 | * | 1/2017 | Yu | ........................... B66B 7/046 |

FOREIGN PATENT DOCUMENTS

| | | |
|---|---|---|
| CN | 101313684 A | 12/2008 |
| CN | 101625022 A | 1/2010 |
| CN | 101778792 A | 7/2010 |
| CN | 102421565 A | 4/2012 |
| CN | 102640072 A | 8/2012 |
| CN | 203938768 U | 11/2014 |
| CN | 104713951 A | 6/2015 |
| CN | 204547091 U | 8/2015 |

OTHER PUBLICATIONS

International Preliminary Report on Patentability issued in connection with corresponding PCT Application No. PCT/CN2015/087538 dated Feb. 20, 2018.

* cited by examiner

LIFTING APPARATUS AND ULTRASONIC INSPECTION SYSTEM

BACKGROUND

Ultrasonic inspection technology, as a non-destructive testing (NDT) technology, has been more and more widely applied to various industrial fields such as the aviation industry.

In a typical ultrasonic inspection system, an ultrasonic probe may be used to inspect a condition of surfaces and interiors of various workpieces or objects to identify flaws in the workpiece or object. When the inspection of the workpiece is performed, it may be required to place the workpiece on a workpiece holding apparatus, and the workpiece may then be moved into a position for inspection with the workpiece holding apparatus. During inspection, the ultrasonic probe may transmit an ultrasonic wave to the workpiece. The transmitted ultrasonic wave may be conducted through a liquid acoustic transmission medium, such as water, to the workpiece. A return ultrasonic wave may be received by the ultrasonic probe through the liquid acoustic transmission medium after reflection by a surface of the workpiece. Image processing may then be performed on the received return ultrasonic wave to construct an image of the workpiece. The image may then be inspected to identify flaws in the workpiece.

It would be desirable to have a workpiece holding apparatus to position a workpiece for ultrasonic inspection accurately and efficiently.

BRIEF DESCRIPTION

This disclosure relates generally to a lifting apparatus, and more particularly to an ultrasonic inspection system utilizing a lifting apparatus.

In one embodiment, the present disclosure provides a lifting apparatus. The lifting apparatus comprises a power driving module for providing a driving force, a plurality of lifting modules for raising and lowering a supporting module upon action of the driving force, and a transmission module located under the supporting module for transmitting the driving force to at least one of the plurality of lifting modules.

In another embodiment, the present disclosure provides an ultrasonic inspection system. The ultrasonic inspection system comprises at least one ultrasonic probe and a lifting apparatus for raising and lowering a workpiece at least partly immersed in a liquid to a suitable position for inspection of the workpiece by the at least one ultrasonic probe. The lifting apparatus comprises a power driving module for providing a driving force, a plurality of lifting modules for raising and lowering a supporting module upon action of the driving force, and a transmission module located under the supporting module for transmitting the driving force to at least one of the plurality of lifting modules. The workpiece is positioned on the supporting module of the lifting apparatus.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
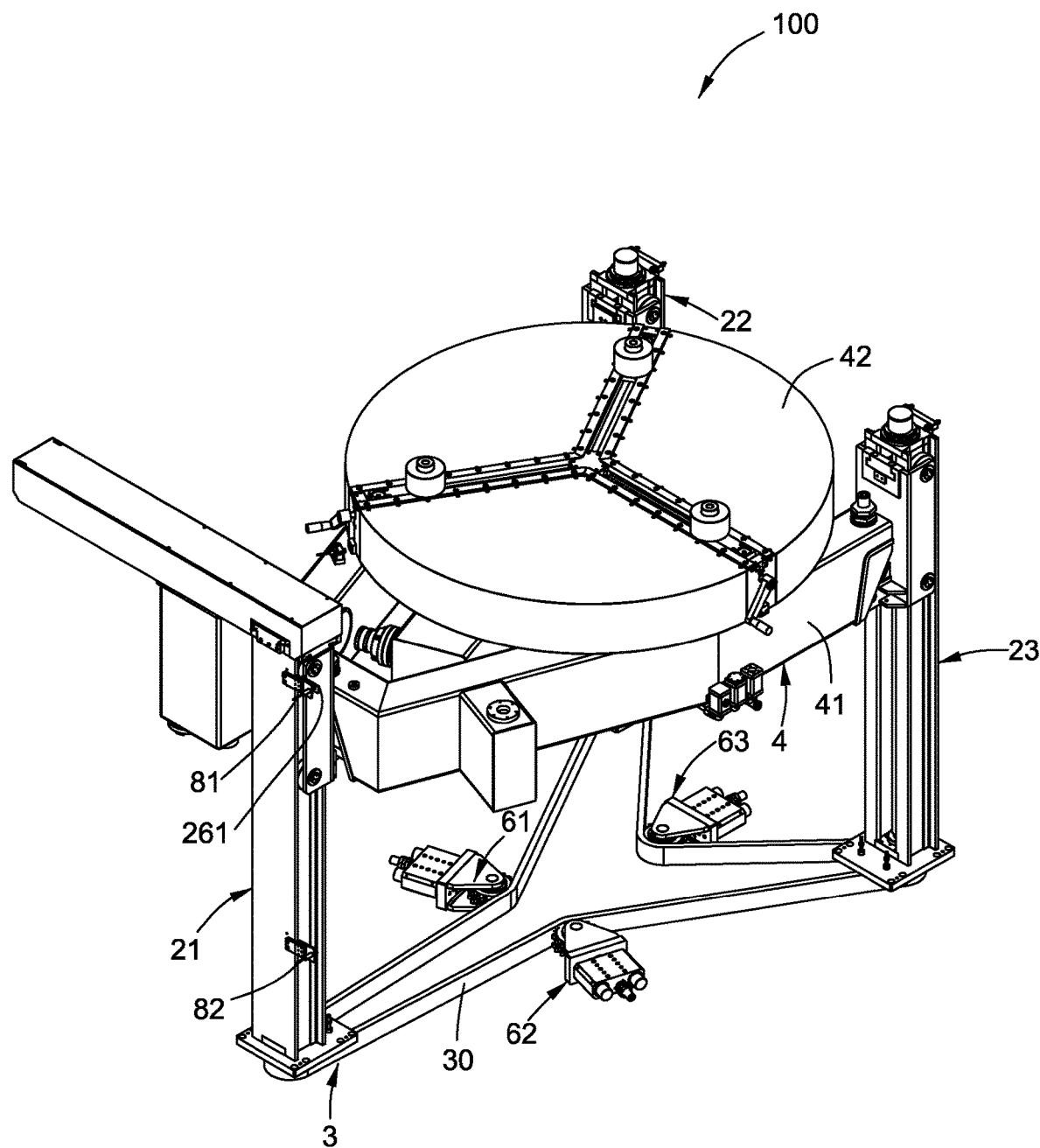
FIG. 1 is a schematic diagram of an exemplary lifting apparatus with a raised supporting module in accordance with an embodiment of the present disclosure.

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", "third" and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. In addition, terms indicating specific locations, such as "up", "down", "left", "right", "front", and "rear", are descriptions with reference to specific accompanying drawings. Embodiments disclosed in the present disclosure may be placed in a manner different from that shown in the figures. Therefore, the location terms used herein should not be limited to locations described in specific embodiments.

Embodiments of the disclosed subject matter provide techniques for a lifting apparatus. For example, a lifting apparatus includes a transmission module which may use a roller chain transmitting mechanism. As described more fully below, some embodiments of the disclosed subject matter relate to a roller chain transmitting mechanism which is configured to adjust a tension of a roller chain. In some embodiment, a lifting apparatus includes a power driving module which may use a belt pulley driving mechanism. In some embodiments, a lifting apparatus includes a lifting module which is configured to raise and lower a workpiece smoothly and/or is configured to adjust a horizontal state of the workpiece easily. In some embodiment, a lifting apparatus includes a supporting module which may use a worm gear driving mechanism. Other embodiments are within the scope of the disclosed subject matter.

FIGS. 1-4 illustrate a schematic diagram of a lifting apparatus 100 in accordance with an embodiment of the present disclosure. As shown in FIGS. 1-4, the lifting apparatus 100 in accordance with an embodiment of the present disclosure may comprise a power driving module 1, a plurality of lifting modules 21, 22, 23, a transmission module 3 and a supporting module 4. The power driving module 1 may be configured for providing a driving force. The plurality of lifting modules 21, 22, 23 may be configured for raising and lowering the supporting module 4 upon action of the driving force. The transmission module 3 may be located under the supporting module 4 and may be configured for transmitting the driving force to at least one of the plurality of lifting modules 21, 22, 23.

The transmission module 3 may be located under the supporting module 4, which may provide for the lifting apparatus 100 having a more compact design.

In one embodiment, the plurality of lifting modules may comprise a first lifting module 21, a second lifting module 22 and a third lifting module 23. The first lifting module 21, the second lifting module 22 and the third lifting module 23 may lift the supporting module 4 between a raised first position (shown in FIG. 1) and a lowered second position (shown in FIG. 2). The first lifting module 21, the second lifting module 22 and the third lifting module 23 may be separately disposed in a triangular shape to provide steady support for the supporting module 4. In other embodiments, the plurality of lifting modules may comprise two, four or more lifting modules.

Figure 3:
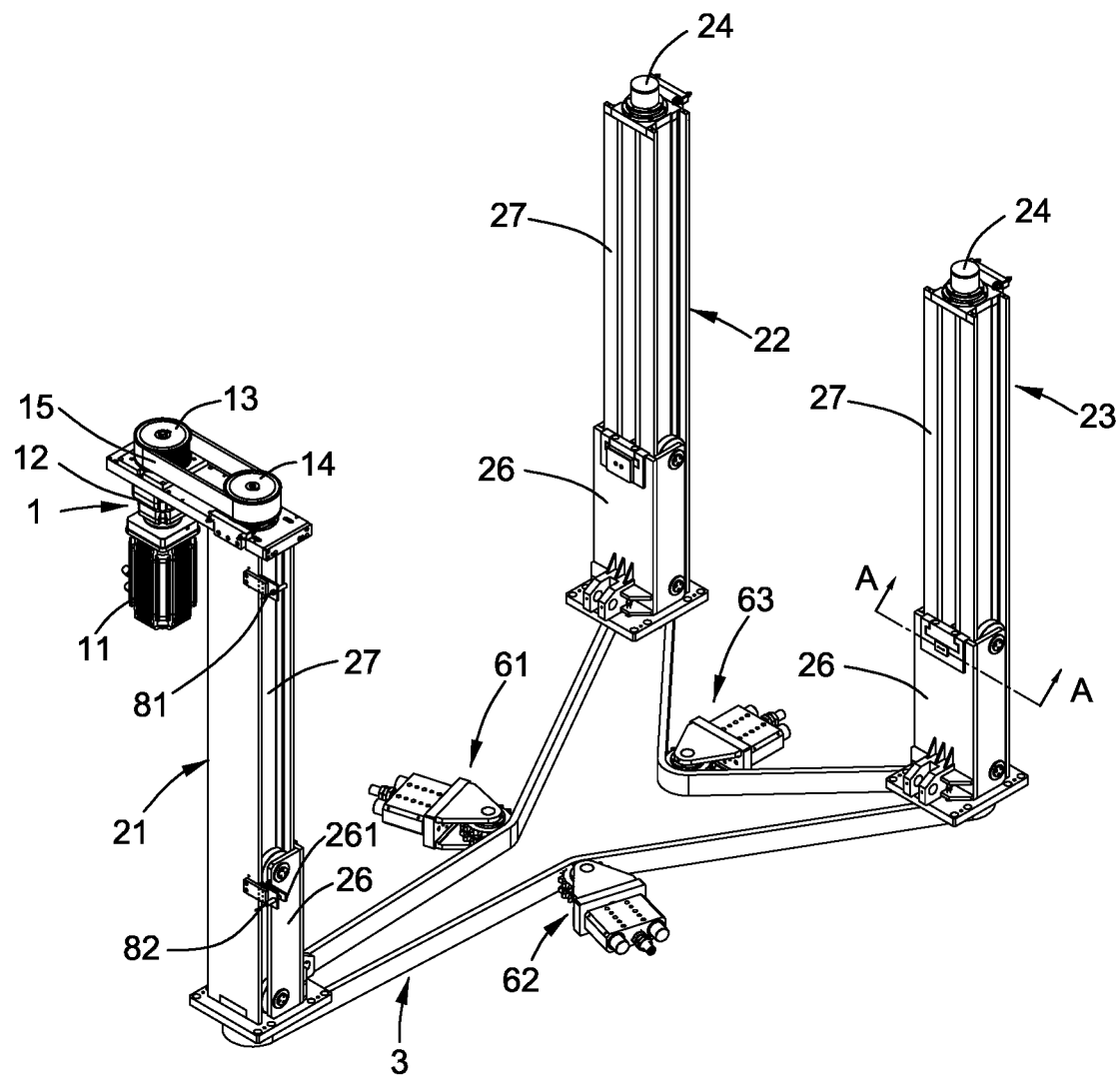
FIG. 3 is a schematic diagram of a portion of the exemplary lifting apparatus.
Figure 4:
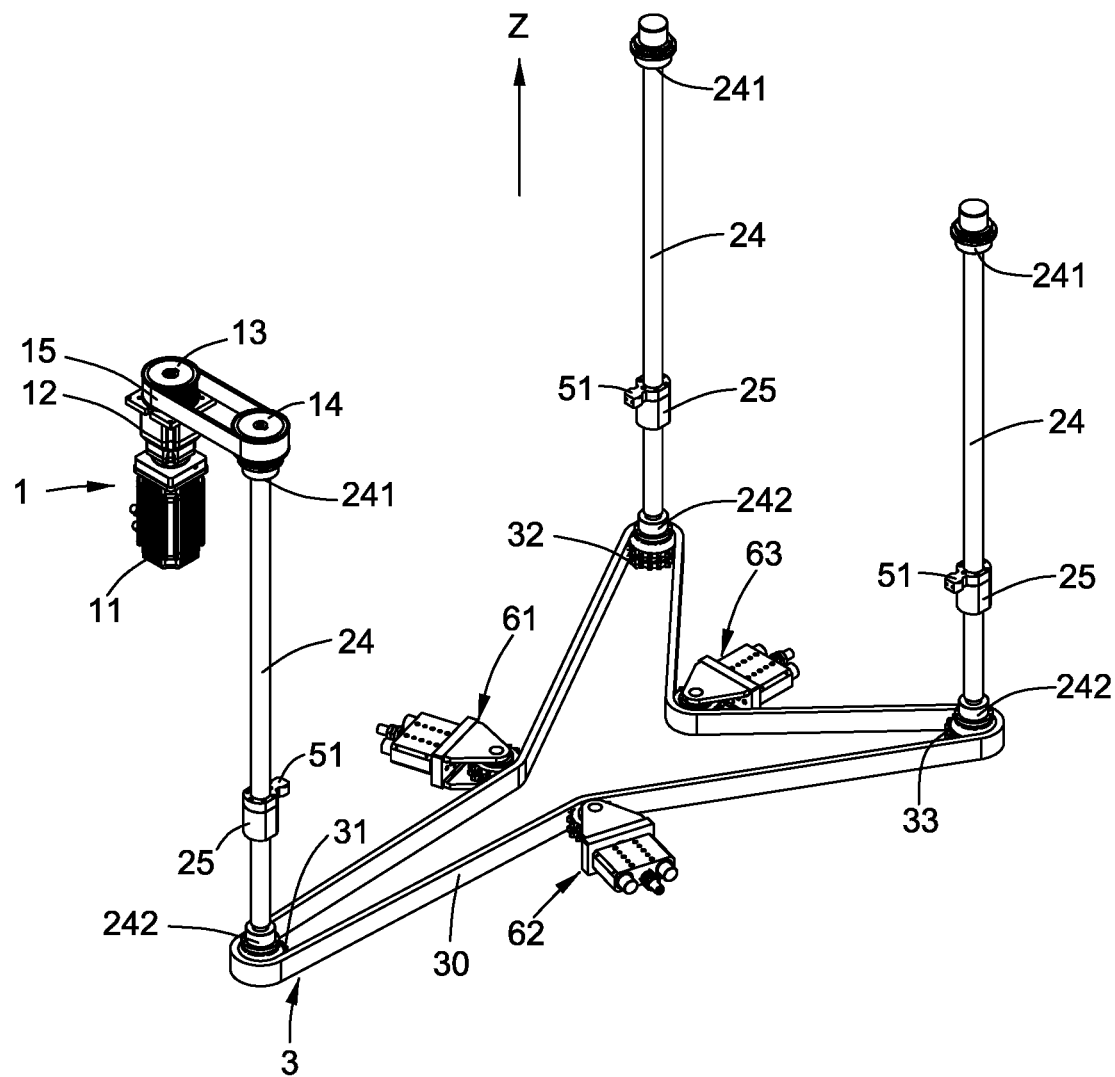
FIG. 4 is a schematic diagram of a power transmission portion of the exemplary lifting apparatus.

FIG. 4 illustrates a power transmission of the lifting apparatus 100. Referring to FIG. 4 in conjunction with FIG. 3, the power driving module 1 may be coupled with the first lifting module 21 so that the power driving module 1 may provide the driving force to the first lifting module 21. The first lifting module 21 may be coupled with the transmission module 3 and the transmission module 3 may be coupled to the second lifting module 22 and the third lifting module 23 so that the transmission module 3 may transmit the driving force to the second lifting module 22 and the third lifting module 23.

The power driving module 1 may comprise a servo motor 11 and a gear box 12. The servo motor 11 may be coupled to the first lifting module 21 via the gear box 12 so that the driving force may be provided to the first lifting module 21. In one embodiment, to reduce the height of the lifting apparatus 100, the power driving module 1 may further comprise a belt pulley driving mechanism. The belt pulley driving mechanism may comprise a first pulley 13 coupled to the gear box 12, a second pulley 14 coupled to the first lifting module 21 and a synchronous belt 15 surrounding the first pulley 13 and the second pulley 14. In this exemplary embodiment of the power driving module 1 comprising a belt pulley driving mechanism, the servo motor 11 and the gear box 12 may be arranged side by side with the first lifting module 21, reducing the height of the lifting apparatus 100.

Each of the first, the second and the third lifting modules 21, 22, 23 may comprise a screw rod 24 and a nut 25 connected with the screw rod 24. The second pulley 14 of the power driving module 1 may be coupled to the screw rod 24 of the first lifting module 21, so the power driving module 1 may drive the screw rod 24 of the first lifting module 21 to rotate. The transmission module 3 may transmit the driving force to the screw rods 24 of the second and the third lifting modules 22, 23 so that the screw rods 24 of the second and the third lifting modules 22, 23 may be driven to rotate. An external screw thread may be arranged on an external surface of the screw rod 24. An internal screw thread may be arranged on an internal surface of the nut 25. The screw rod 24 may be disposed along a vertical direction Z. A first end of the screw rod 24 may be positioned by a first bearing 241 and a second end of the screw rod 24 may be positioned by a second bearing 242, so the rotation of the screw rod 24 around the vertical direction Z may be permitted and the movement of the screw rod 24 along the vertical direction Z may be restricted. When the screw rod 24 is driven to rotate under the action of the driving force, the screw rod 24 may be able to drive the nut 25 to travel. The screw rod 24 may not move along the vertical direction Z due to restriction of the first bearing 241 and the second bearing 242, and the nut 25 may simultaneously perform a linear motion in the vertical direction Z.

Figure 2:
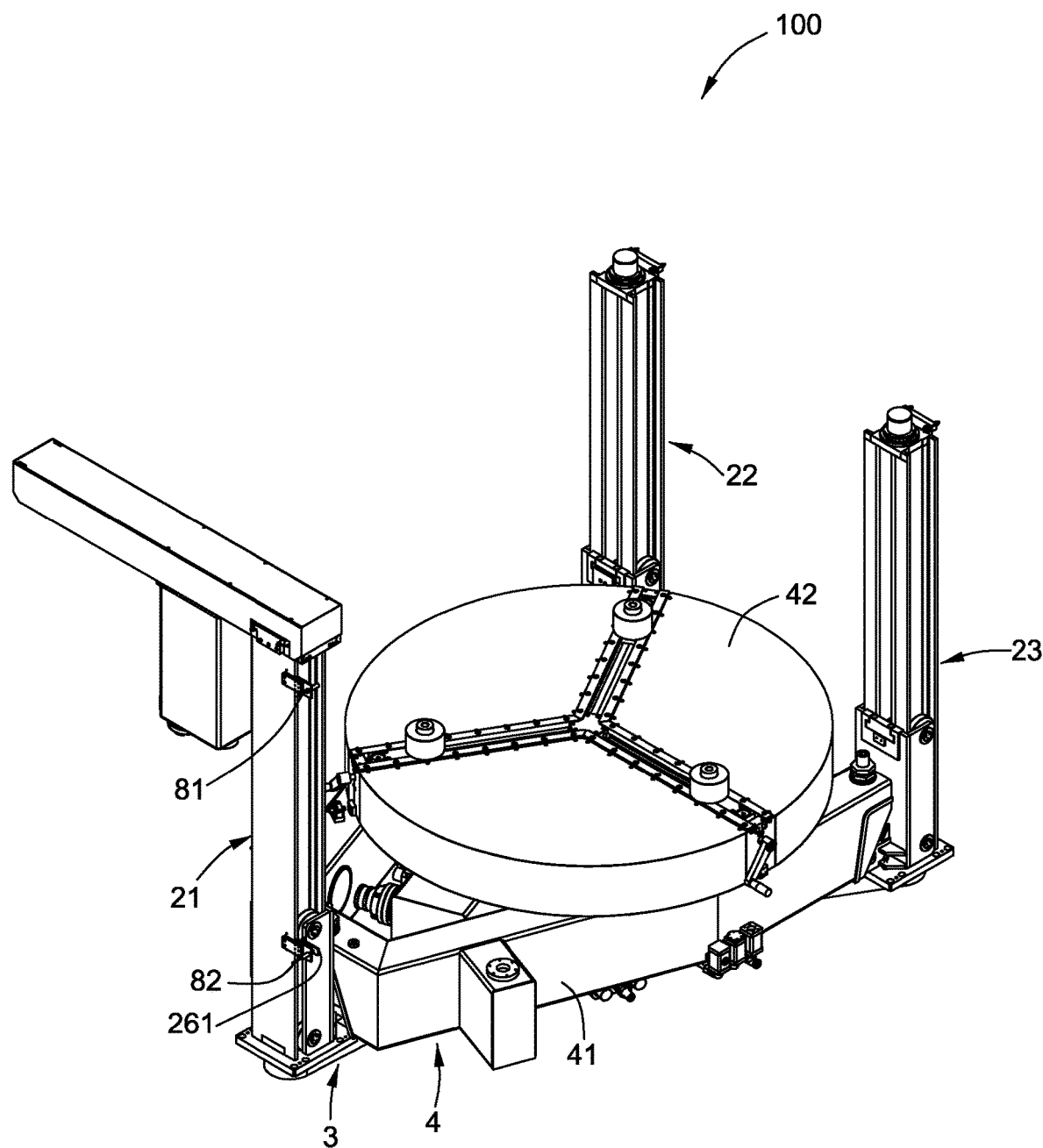
FIG. 2 is a schematic diagram of the exemplary lifting apparatus with a lowered supporting module.

With reference to FIGS. 1-3, each of the first, the second and the third lifting modules 21, 22, 23 may further comprise a carriage vehicle 26 and a guide pillar 27. The carriage vehicle 26 may be disposed to be movable along the guide pillar 27. The carriage vehicle 26 may be coupled to the nut 25 and may be connected to the supporting module 4. The nut 25 may be able to cause the carriage vehicle 26 to move along the guide pillar 27 and may raise and lower the supporting module 4 between the first position and the second position.

Figure 5:
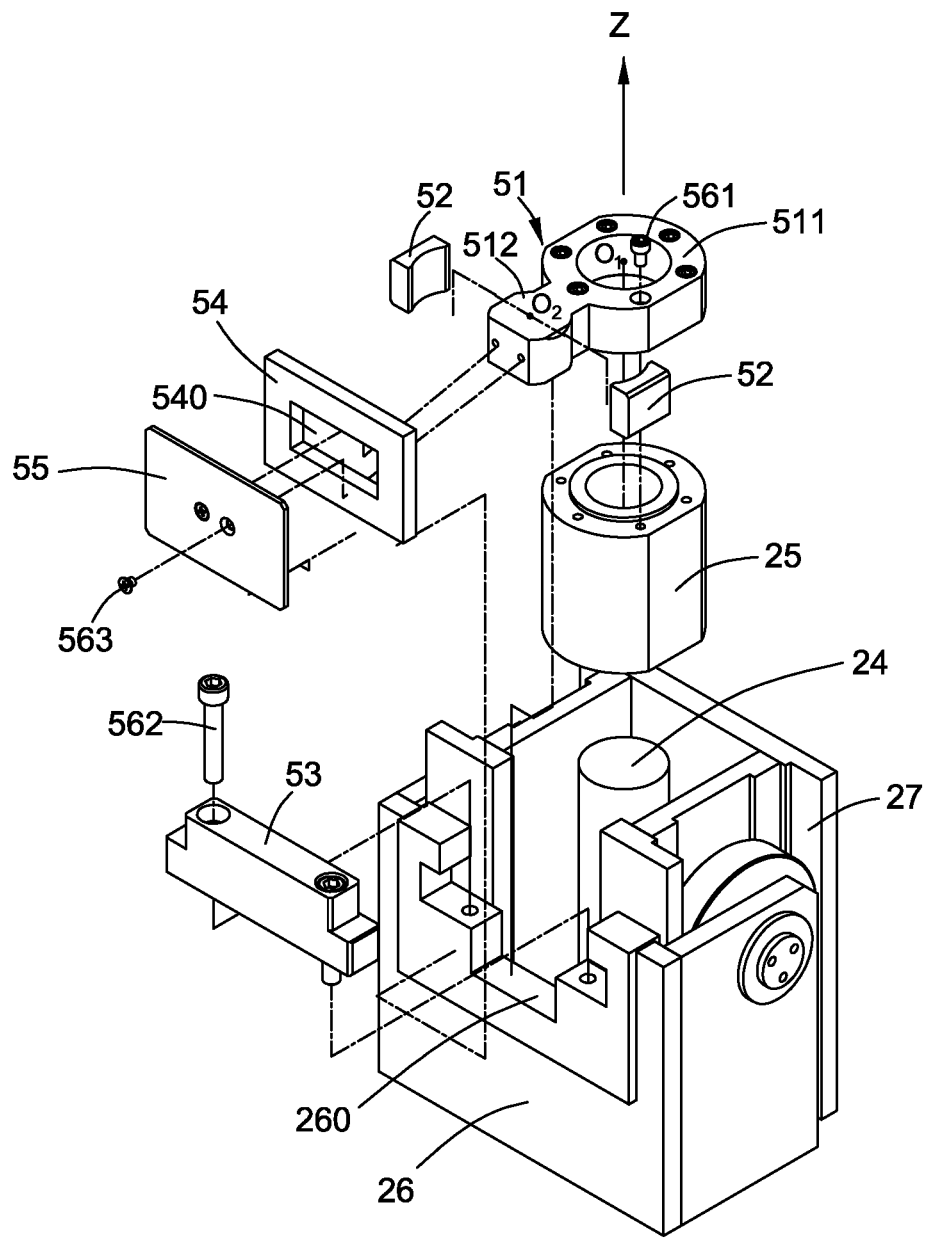
FIG. 5 is an exploded view of a portion of an exemplary lifting module in accordance with an embodiment of the present disclosure.
Figure 6:
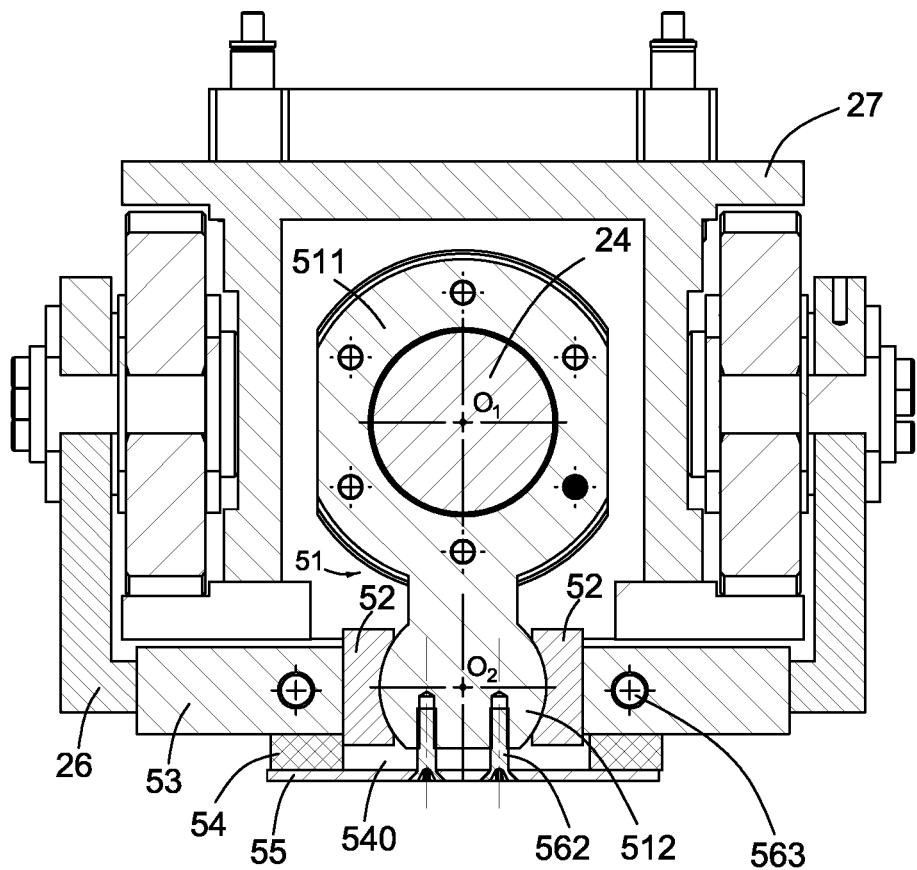
FIG. 6 is a cross-sectional view of the lifting module of FIG. 3 taken along line A-A.

Referring to FIGS. 5-6 in conjunction with FIGS. 3-4, in one embodiment of the present disclosure, at least one of the lifting modules 21, 22, 23 may further comprise a nut fixed member 51. The nut fixed member 51 may have a first cylinder 511 and a second cylinder 512 which may be integral. The first cylinder 511 has an axis $O_1$ in the vertical direction Z and the second cylinder 512 has an axis $O_2$ in the vertical direction Z. The first cylinder 511 of the nut fixed member 51 may be fixed onto the nut 25 by bolts 561, and the screw rod 24 may be driven to rotate upon the action of the driving force and may cause the nut 25 and the nut fixed member 51 to move along the vertical direction Z. The second cylinder 512 of the nut fixed member 51 may be positioned within the carriage vehicle 26 to allow the nut fixed member 51 and the carriage vehicle 26 to move along the vertical direction Z. The nut 25 may have two degrees of freedom, that is, the nut 25 may be able to rotate a little angle about the vertical direction Z and may be able to move a distance along a connecting line direction $O_1O_2$ between the axes $O_1$, $O_2$ of the first and the second cylinders 511, 512. The two degrees of freedom of the nut 25 may make the movement of the nut 25 smoother with reduced vibration and noise.

Additionally, the at least one lifting module 21, 22, 23 may further comprise a pair of floating blocks 52. The pair of floating blocks 52 may be positioned at opposite sides of the second cylinder 512 of the nut fixed member 51 in a rotatable contacting manner and may be able to move together with the nut fixed member 51 along the connecting line direction $O_1O_2$.

In an exemplary embodiment, the carriage vehicle 26 may comprise a chamber 260 therein, and the at least one lifting module 21, 22, 23 may further comprise a press block 53 which may be fixed onto the carriage vehicle 26 by a pair of bolts 562. The second cylinder 512 of the nut fixed member 51 and the pair of floating blocks 52 may be restricted in the chamber 260 of the carriage vehicle 26 along the vertical direction Z by the press block 53.

In an exemplary embodiment, the at least one lifting module 21, 22, 23 may comprise a damping member 54. The damping member 54 may consist of a rubber material, although other materials are contemplated. The damping member 54 may be attached to an end of the second cylinder 512 of the nut fixed member 51 and may allow damping vibration of the nut 25. The damping member 54 may make the movement of the nut 25 quieter, reducing vibration and noise, and may extend the lifetime of the nut 25.

In an exemplary embodiment, the at least one lifting module 21, 22, 23 may further comprise a mounting plate 55. The damping member 54 may define an aperture 540 therein for exposing the second cylinder 512 and the pair of floating blocks 52. The damping member 54 may be sandwiched between the carriage vehicle 26 and the mounting plate 55, and the mounting plate 55 may be fixed onto the end of the second cylinder 512 by a pair of bolts 563. The damping member 54 may be mounted onto the end of the second cylinder 512 via the mounting plate 55.

FIG. 6 illustrates an embodiment of the nut fixed member 51 when the screw rod 24 is straight. Additional embodiments of the nut fixed member 51 will be described in detail below when the screw rod 24 may be deformed.

Figure 7:
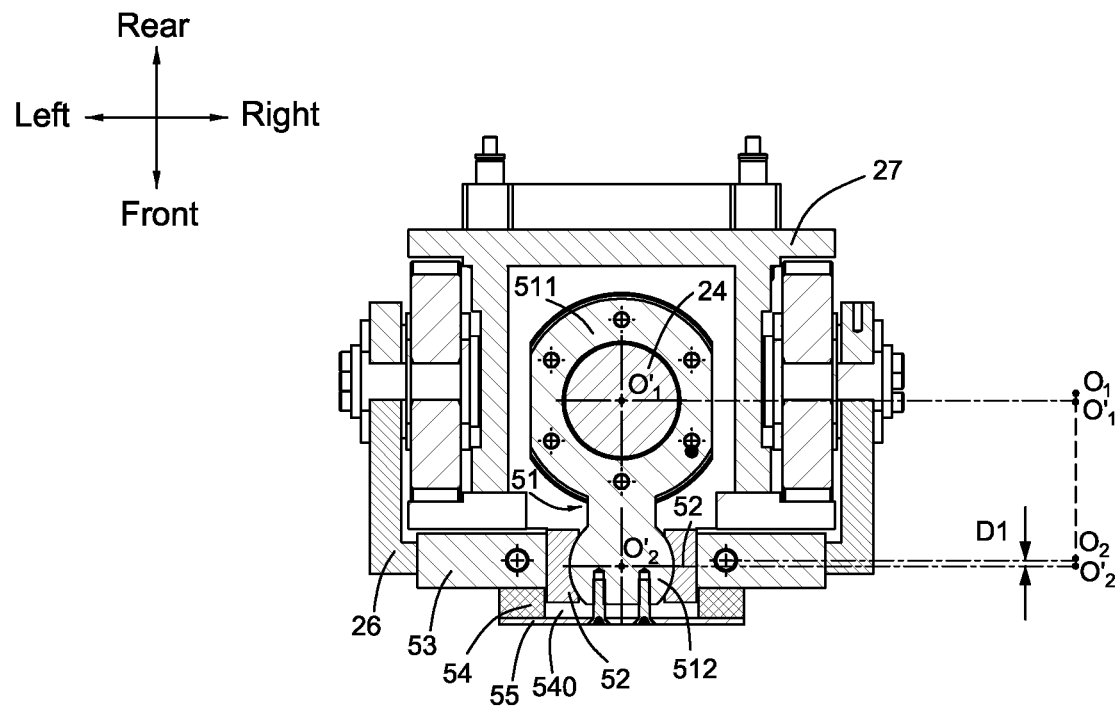
FIG. 7 is a cross-sectional view of the lifting module of FIG. 6 with a screw rod deformed frontwards.

In an embodiment, with reference to FIG. 7, if the screw rod 24 deforms slightly towards the front (that is, an axis of the screw rod 24 deflects frontwards), an axis of the nut 25, i.e. the axis $O_1$ of the first cylinder 511 of the nut fixed member 51 may deflect frontwards, for example, the axis $O_1$ of the first cylinder 511 of the nut fixed member 51 may move frontwards to $O_1'$. In this embodiment, the second cylinder 512 of the nut fixed member 51 together with the pair of floating blocks 52 may move frontwards along the connecting line direction $O_1O_2$ so that the axis $O_2$ of the second cylinder 512 may move frontwards a distance D1 to $O_2'$. The nut fixed member 51 may move with the movement of the second cylinder 512 so that the axis $O_1$ of the first cylinder 511 of the nut fixed member 51 may move frontwards to $O_1'$. Because the first cylinder 511 of the nut fixed member 51 is fixed onto the nut 25, the nut fixed member 51 and the nut 25 may move frontwards together. Thus, the nut 25 may also move frontwards the distance D1 along the connecting line direction $O_1O_2$ which may smoothen, i.e. with reduced vibration and noise, the movement of the nut 25 along the deformed screw rod 24.

Figure 8:
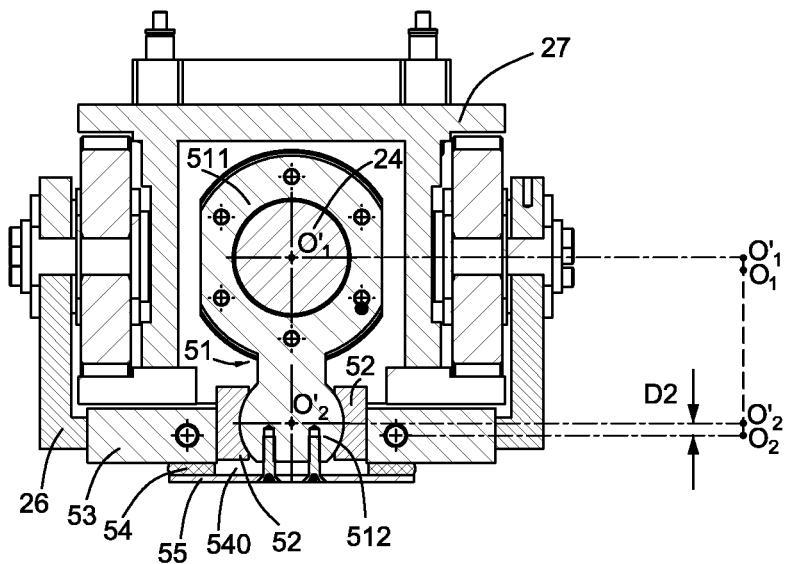
FIG. 8 is a cross-sectional view of the lifting module of FIG. 6 with the screw rod deformed rearwards.

With reference to FIG. 8, if the screw rod 24 deforms slightly towards the rear (that is, an axis of the screw rod 24 deflects rearwards), an axis of the nut 25, i.e. the axis $O_1$ of the first cylinder 511 of the nut fixed member 51 may deflect rearwards, for example, the axis $O_1$ of the first cylinder 511 of the nut fixed member 51 may move rearwards to $O_1'$. In this embodiment, the second cylinder 512 of the nut fixed member 51 together with the pair of floating blocks 52 may move rearwards along the connecting line direction $O_1O_2$ so that the axis $O_2$ of the second cylinder 512 may move rearwards a distance D2 to $O_2'$. The nut fixed member 51 may move with the movement of the second cylinder 512 so that the axis $O_1$ of the first cylinder 511 of the nut fixed member 51 may move rearwards to $O_1'$. The nut fixed member 51 and the nut 25 may move rearwards together. Thus, the nut 25 may also move rearwards the distance D2 along the connecting line direction $O_1O_2$ which may smoothen, i.e. with reduced vibration and noise, the movement of the nut 25 along the deformed screw rod 24.

Figure 9:
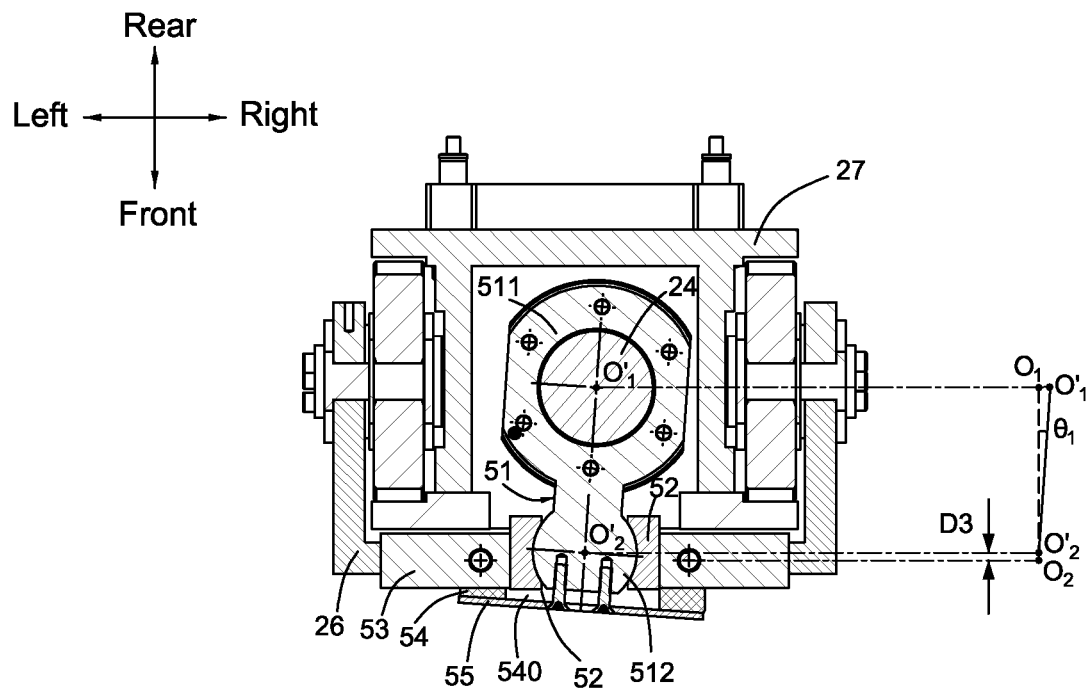
FIG. 9 is a cross-sectional view of the lifting module of FIG. 6 with the screw rod deformed rightwards.

With reference to FIG. 9, if the screw rod 24 deforms slightly towards the right (that is, an axis of the screw rod 24 deflects rightwards), an axis of the nut 25, i.e. the axis $O_1$ of the first cylinder 511 of the nut fixed member 51 may deflect rightwards, for example, the axis $O_1$ of the first cylinder 511 of the nut fixed member 51 may move rightwards to $O_1'$. In this embodiment, the second cylinder 512 of the nut fixed member 51 may rotate a little angle $\theta_1$ towards the right about the vertical direction Z within the pair of floating blocks 52, and at the same time, the second cylinder 512 together with the pair of floating blocks 52 may also move rearwards along the connecting line direction $O_1O_2$ so that the axis $O_2$ of the second cylinder 512 may move rearwards a distance D3 to $O_2'$. The nut fixed member 51 may rotate and move with the rotation and movement of the second cylinder 512 so that the axis $O_1$ of the first cylinder 511 of the nut fixed member 51 may move rightwards to $O_1'$. The nut fixed member 51 and the nut 25 may rotate and move together. Thus, the nut 25 may also rotate rightwards the angle $\theta_1$ about the vertical direction Z and move rearwards the distance D3 along the connecting line direction $O_1O_2$ which may smoothen, i.e. with reduced vibration and noise, the movement of the nut 25 along the deformed screw rod 24.

Figure 10:
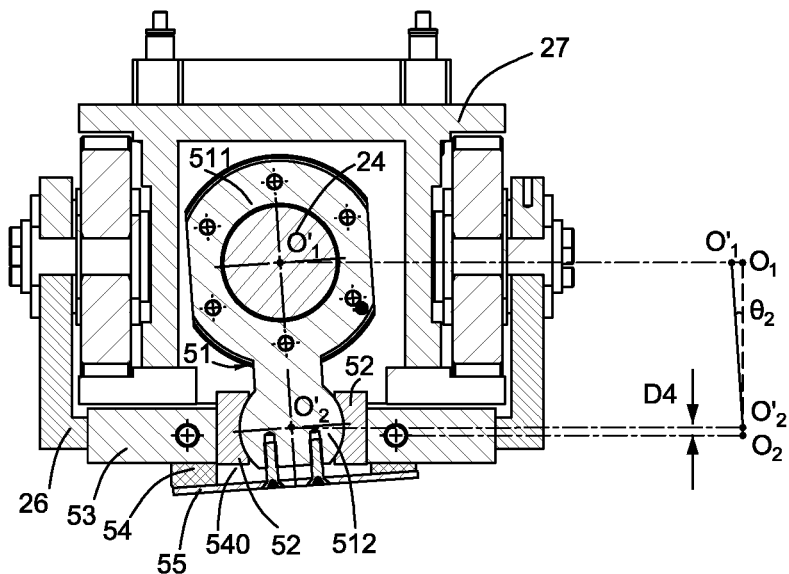
FIG. 10 is a cross-sectional view of the lifting module of FIG. 6 with the screw rod deformed leftwards.

With reference to FIG. 10, if the screw rod 24 deforms slightly towards the left (that is, an axis of the screw rod 24 deflects leftwards), an axis of the nut 25, i.e. the axis $O_1$ of the first cylinder 511 of the nut fixed member 51 may deflect leftwards, for example, the axis $O_1$ of the first cylinder 511 of the nut fixed member 51 may move leftwards to $O_1'$. In this embodiment, the second cylinder 512 of the nut fixed member 51 may rotate a little angle $\theta_2$ towards the left about the vertical direction Z within the pair of floating blocks 52, and at the same time, the second cylinder 512 together with the pair of floating blocks 52 may also move rearwards along the connecting line direction $O_1O_2$ so that the axis $O_2$ of the second cylinder 512 may move rearwards a distance D4 to $O_2'$. The nut fixed member 51 may rotate and move with the rotation and movement of the second cylinder 512 so that the axis $O_1$ of the first cylinder 511 of the nut fixed member 51 may move leftwards to $O_1'$. The nut fixed member 51 and the nut 25 may rotate and move together. Thus, the nut 25 may also rotate leftwards the angle $\theta_2$ about the vertical direction Z and move rearwards the distance D4 along the connecting line direction $O_1O_2$ which may smoothen, i.e. with reduced vibration and noise, the movement of the nut 25 along the deformed screw rod 24.

The nut fixed member 51 may allow the nut 25 to have two degrees of freedom, i.e. one degree of freedom in the vertical direction Z and one degree of freedom in the connecting line direction $O_1O_2$, so the nut 25 may rotate a little angle about the vertical direction Z and may move a distance along the connecting line direction $O_1O_2$. The nut fixed member 51 may smoothen the movement of the nut 25 along the screw rod 24, increasing the lifetime of the nut 25, and increasing the manufacturing tolerance of the screw rod 24.

In another embodiment of the present disclosure, referring to FIGS. 3-4, the transmission module 3 may comprise a roller chain 30 and at least one tension adjusting unit 61, 62 which may be engaged to the roller chain 30 for self-adjusting a tension of the roller chain 30. The roller chain 30 may be engaged to the at least one lifting module. In this exemplary embodiment, the roller chain 30 may be engaged to the first lifting module 21, the second lifting module 22 and the third lifting module 23. The transmission module 3 may comprise a first roller 31 coupled to the screw rod 24 of the first lifting module 21, a second roller 32 coupled to the screw rod 24 of the second lifting module 22, and a third roller 33 coupled to the screw rod 24 of the third lifting module 23. The roller chain 30 may surround the first roller 31, the second roller 32 and the third roller 33.

The transmission module 3 may comprise a first tension adjusting unit 61 engaged to the roller chain 30 between the first and the second lifting modules 21, 22, a second tension adjusting unit 62 engaged to the roller chain 30 between the first and the third lifting modules 21, 23, and a third tension adjusting unit 63 engaged to the roller chain 30 between the second and the third lifting modules 22, 23. When the lifting apparatus 100 is in a non-operating state, the first, the second and the third tension adjusting units 61, 62, 63 may pretension the roller chain 30. Additionally, the first and the second tension adjusting units 61, 62 may self-adjust the tension of the roller chain 30 when the lifting apparatus 100 is in an operating state.

Figure 11:
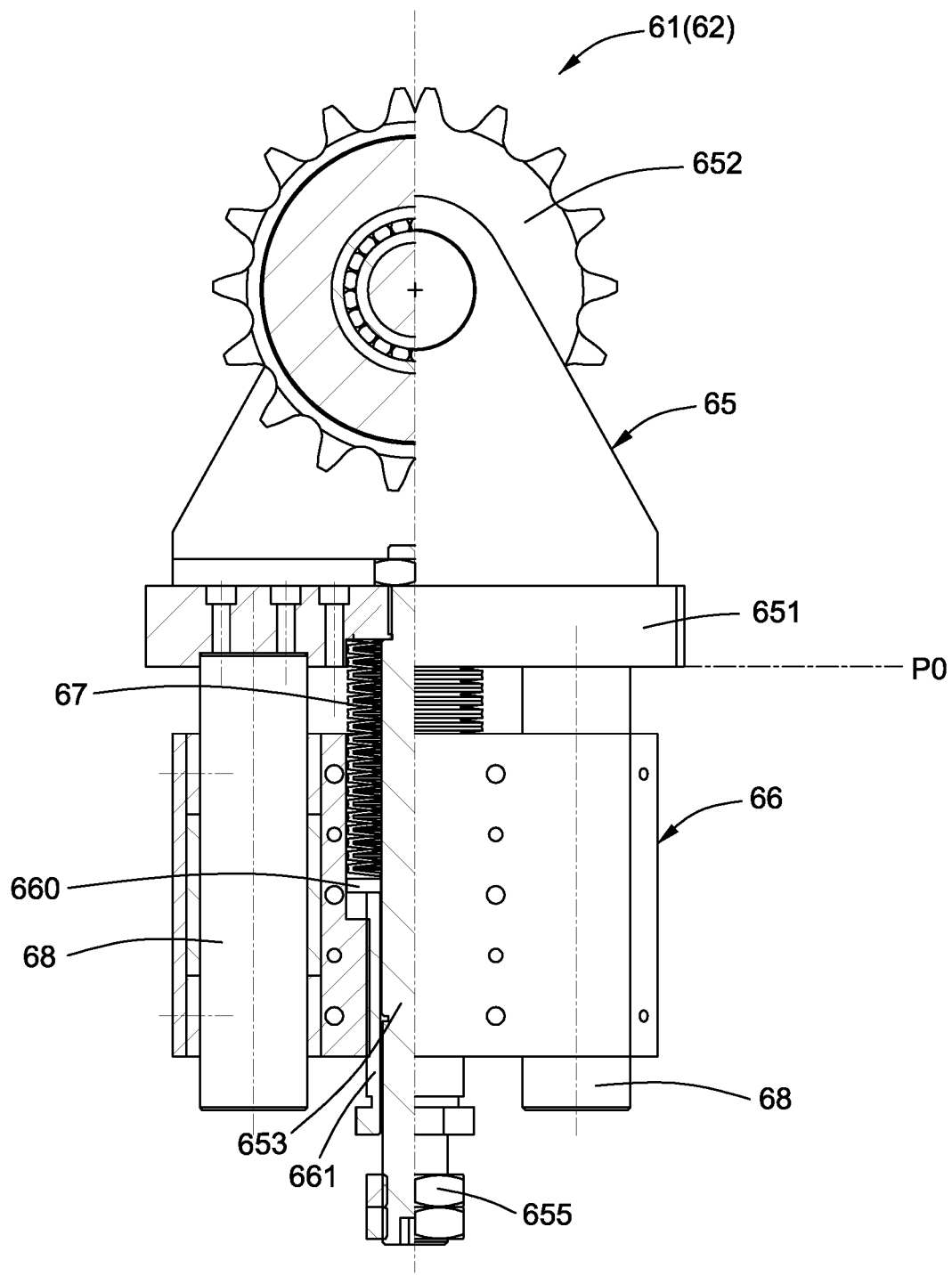
FIG. 11 is a schematic diagram of an exemplary first/second tension adjusting unit in accordance with an embodiment of the present disclosure.
Figure 12:
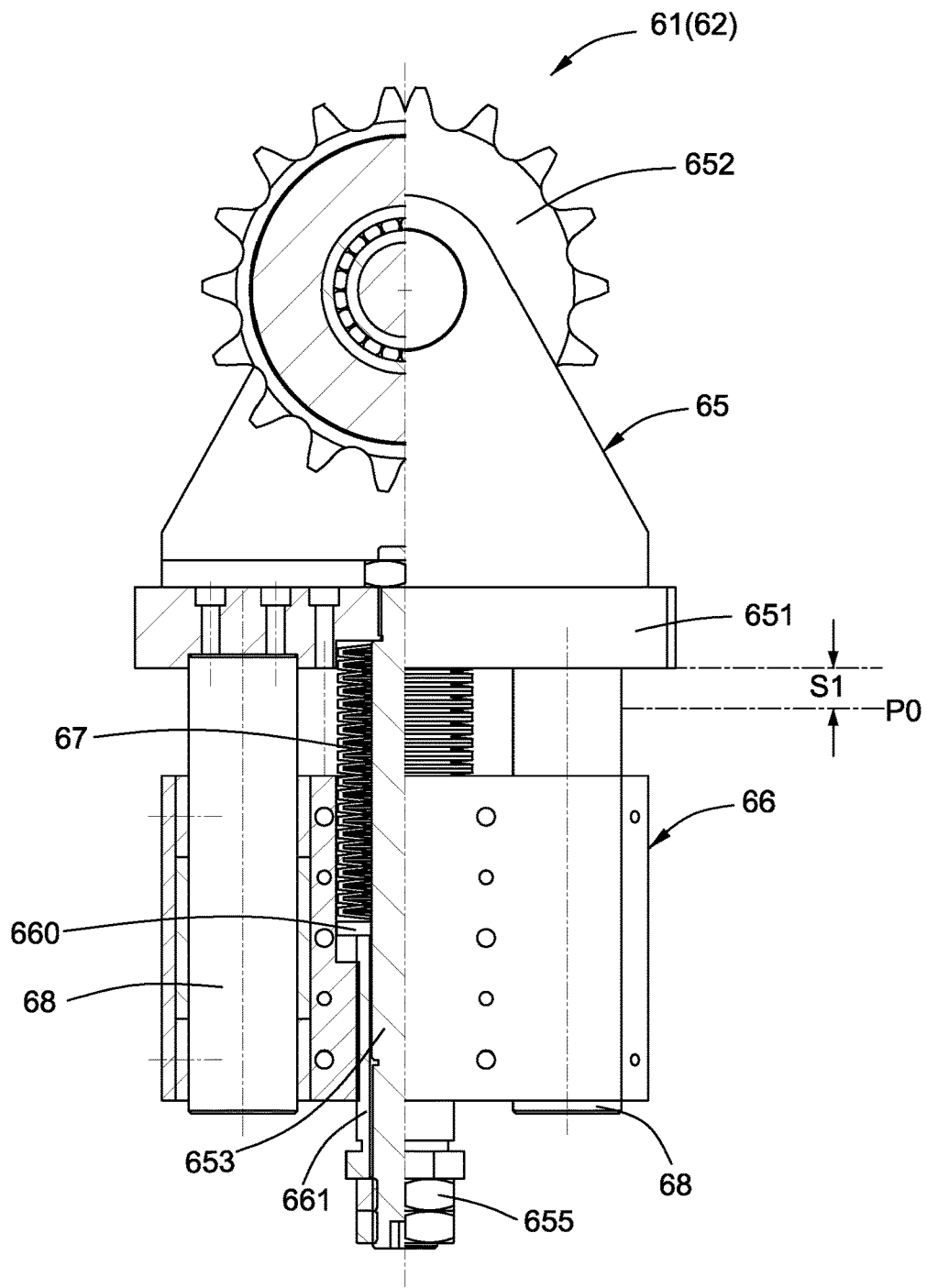
FIG. 12 is a schematic diagram of the first/second tension adjusting unit of FIG. 11 under a lesser tension.
Figure 13:
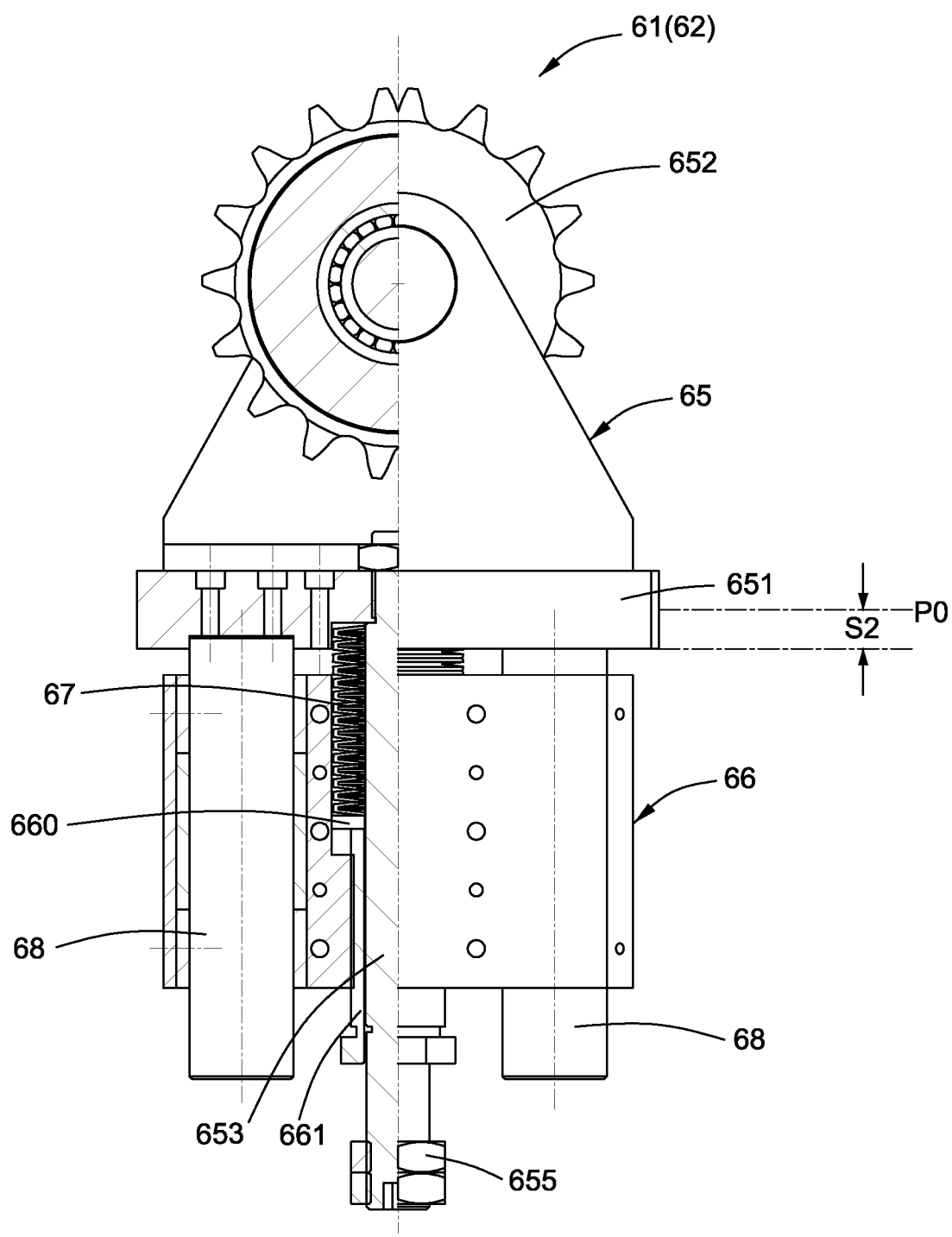
FIG. 13 is a schematic diagram of the first/second tension adjusting unit of FIG. 11 under a greater tension.

With reference to FIG. 11, each of the first and the second tension adjusting units 61, 62 may comprise a movable member 65, a fixed member 66 and a resilient member 67 positioned between the movable member 65 and the fixed member 66. The resilient member 67 may be, for example, a spring. When the lifting apparatus 100 is in the non-operating state, the movable member 65 may be engaged to the roller chain 30 to pretension the roller chain 30 upon action of resilient force of the resilient member 67. At this time, the movable member 65 may be located in a position P0. When the lifting apparatus 100 is in the operating state and the tension of the roller chain 30 is changed, the movable member 65 may move relative to the fixed member 66 upon the action of resilient force of the resilient member 67, as shown in FIGS. 12-13, which will be further described below.

In one embodiment, the fixed member 66 may have a passage 660 therein. The movable member 65 may comprise a housing 651, a roller 652 which may be rotatably coupled to the housing 651 and meshed with the roller chain 30, and a sliding rod 653. A first end of the sliding rod 653 may be fixed onto the housing 651 and a second end of the sliding rod 653 may extend beyond the passage 660 and may be slidable within the passage 660 upon the action of resilient force of the resilient member 67.

The fixed member 66 may further comprise a sleeve 661. The sleeve 661 may be pressed against one end of the resilient member 67 and the other end of the resilient member 67 may be fixed onto the housing 651. The sleeve 661 may be detachably fixed within the passage 660 and the sliding rod 653 may be slidable within the sleeve 661. The sleeve 661 may be fixed such that the resilient member 67 may be compressed and may provide a pretension to allow the roller 652 to mesh with the roller chain 30.

Each of the first and the second tension adjusting units 61, 62 may further comprise a guiding member 68 which may guide the movable member 65 to move relative to the fixed member 66. The guiding member 68 may comprise a pair of guiding pins which may be disposed at opposite two sides of the passage 660 of the fixed member 66. The pair of guiding pins may slide relative to the fixed member 66 which may guide the sliding rod 653 to slide within the sleeve 661.

With reference to FIG. 12, when the tension of the roller chain 30 becomes lesser, the resilient member 67 may be stretched, so upon the action of resilient force of the resilient member 67, the resilient member 67 may push the sliding rod 653 of the movable member 65 to slide relative to the sleeve 661 of the fixed member 66 in a direction toward the roller chain 30 which may increase the tension of the roller chain 30. The sliding rod 653 may not move until a balance may be achieved between the resilient force of the resilient member 67 and a new tension of the roller chain 30. At this time, the resilient member 67 may move a distance S1 relative to the fixed member 66 in a direction toward the roller chain 30 from the position P0. In order to prevent the sliding rod 653 of the resilient member 67 from falling off the sleeve 661 of the fixed member 66, a pair of locker nuts 655 may be disposed at a free end of the sliding rod 653. When a sufficient tension of the roller chain 30 may be achieved, sliding of the sliding rod 653 of the resilient member 67, relative to the sleeve 661, may be restricted by the pair of locker nuts 655.

With reference to FIG. 13, when the tension of the roller chain 30 becomes greater, the resilient member 67 may be further compressed, so upon the action of the resilient force of the resilient member 67, the resilient member 67 may pull the sliding rod 653 of the movable member 65 to slide relative to the sleeve 661 of the fixed member 66 in a direction away from the roller chain 30 which may reduce the tension of the roller chain 30. The sliding rod 653 may not move until a balance is achieved between the resilient force of the resilient member 67 and a new tension of the roller chain 30. At this time, the resilient member 67 may move a distance S2 relative to the fixed member 66 in a direction away from the roller chain 30 from the position P0. The fixed member 66 may prevent the sliding rod 653 of the resilient member 67 from moving excessively. When a sufficient tension of the roller chain 30 may be achieved, the sliding rod 653 of the resilient member 67 may be restricted by the fixed member 66 and may be prevented from sliding relative to the sleeve 661 of the fixed member 66.

When the lifting apparatus 100 is in the operating state, the first roller 31 may function as a driving roller, and the second roller 32 and the third roller 33 may function as a driven roller. The first and the second tension adjusting units 61, 62 may self-adjust the tension of the roller chain 30 in opposing directions when the lifting apparatus 100 is in the operating state.

For example, when the first roller 31 is rotated clockwise, tension of the roller chain 30 between the first roller 31 and the second roller 32 may become reduced, at this time, the movable member 65 of the first tension adjusting unit 61 may move relative to the fixed member 66 of the first tension adjusting unit 61 in a direction toward the roller chain 30 (shown in FIG. 12), so the tension of the roller chain 30 between the first roller 31 and the second roller 32 may be increased. At the same time, when the first roller 31 is rotated clockwise, tension of the roller chain 30 between the first roller 31 and the third roller 33 may become greater, at this time, the movable member 65 of the second tension adjusting unit 62 may move relative to the fixed member 66 of the second tension adjusting unit 62 in a direction away from the roller chain 30 (shown in FIG. 13), so the tension of the roller chain 30 between the first roller 31 and the third roller 33 may be reduced.

Similarly, when the first roller 31 is rotated counterclockwise, tension of the roller chain 30 between the first roller 31 and the second roller 32 may be increased, at this time, the movable member 65 of the first tension adjusting unit 61 may move relative to the fixed member 66 of the first tension adjusting unit 61 in a direction away from the roller chain 30 (shown in FIG. 13), so the tension of the roller chain 30 between the first roller 31 and the second roller 32 may be reduced. At the same time, when the first roller 31 is rotated counterclockwise, tension of the roller chain 30 between the first roller 31 and the third roller 33 may be decreased, at this time, the movable member 65 of the second tension adjusting unit 62 may move relative to the fixed member 66 of the second tension adjusting unit 62 in a direction toward the roller chain 30 (shown in FIG. 12), so the tension of the roller chain 30 between the first roller 31 and the third roller 33 may be increased.

Therefore, when the lifting apparatus 100 is in the operating state, regardless of clockwise rotation or counterclockwise rotation of the first roller 31, the first tension adjusting unit 61 and the second tension adjusting unit 62 may self-adjust the tension of the roller chain 30.

Figure 14:
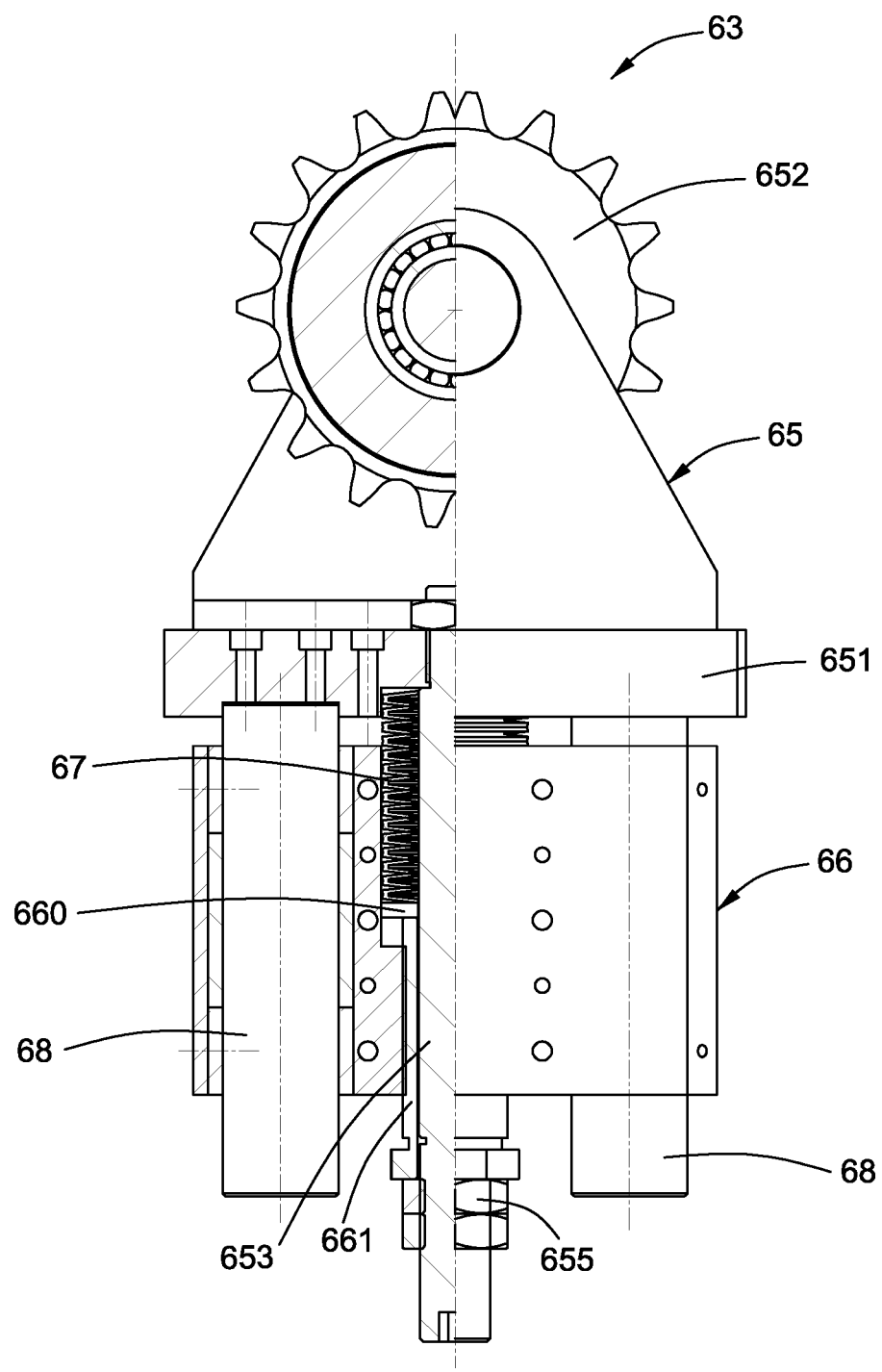
FIG. 14 is a schematic diagram of an exemplary third tension adjusting unit in accordance with an embodiment of the present disclosure.

Referring to FIG. 14, the third tension adjusting unit 63 may have a structure similar to the first and the second tension adjusting units 61, 62. But different from the first and the second tension adjusting units 61, 62, in the third tension adjusting unit 63, the sliding rod 653 of the movable member 65 may be secured by the pair of locker nuts 655 to restrict movement relative to the sleeve 661 of the fixed member 66 after the third tension adjusting unit 63 is adjusted to pretension the roller chain 30, restricting the movable member 65 of the third tension adjusting unit 63 from moving relative to the fixed member 66 when the lifting apparatus 100 is in the operating state.

In an exemplary embodiment of the present disclosure, with reference to FIGS. 15-18, at least one of the plurality of lifting modules 21, 22, 23 may further comprise an adjustable foot. The carriage vehicle 26 may be connected to the supporting module 4 via the adjustable foot. The adjustable foot may support the supporting module 4 and may be able to finely adjust a height of the supporting module 4 in a stationary status.

Figure 15:
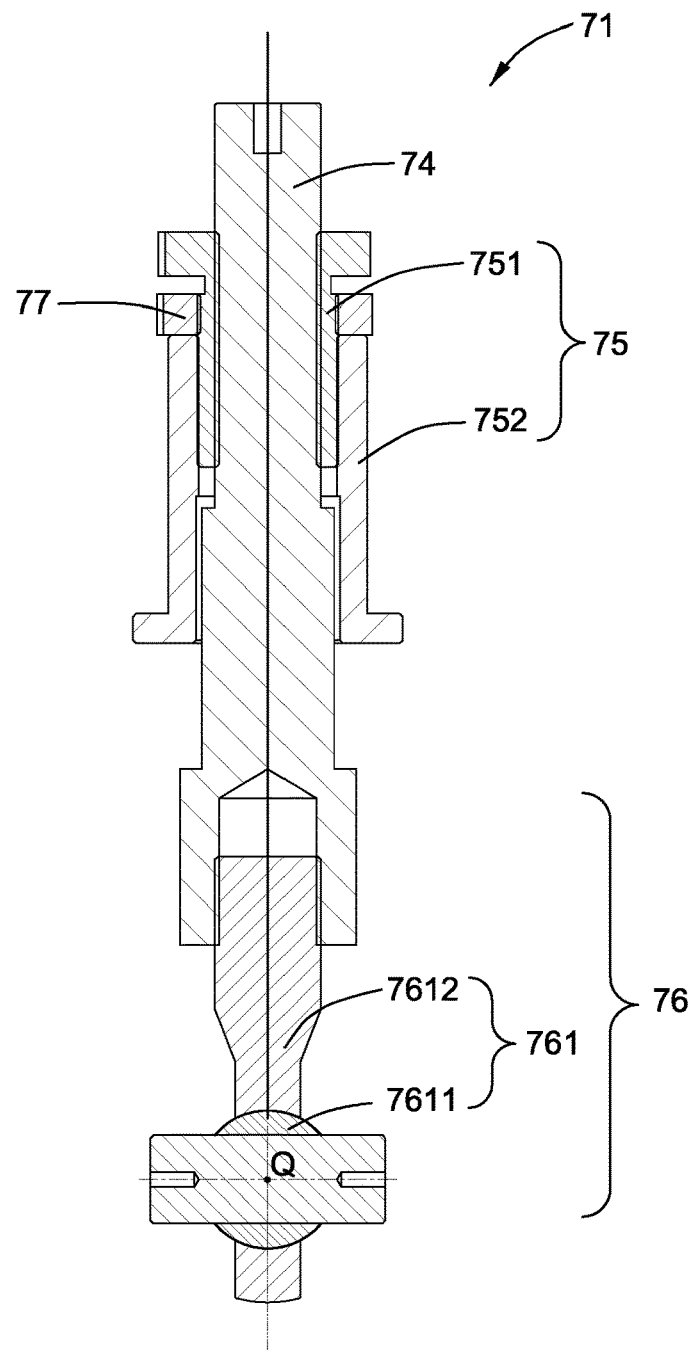
FIG. 15 is a cross-sectional view of an exemplary first adjustable foot in accordance with an embodiment of the present disclosure.
Figure 16:
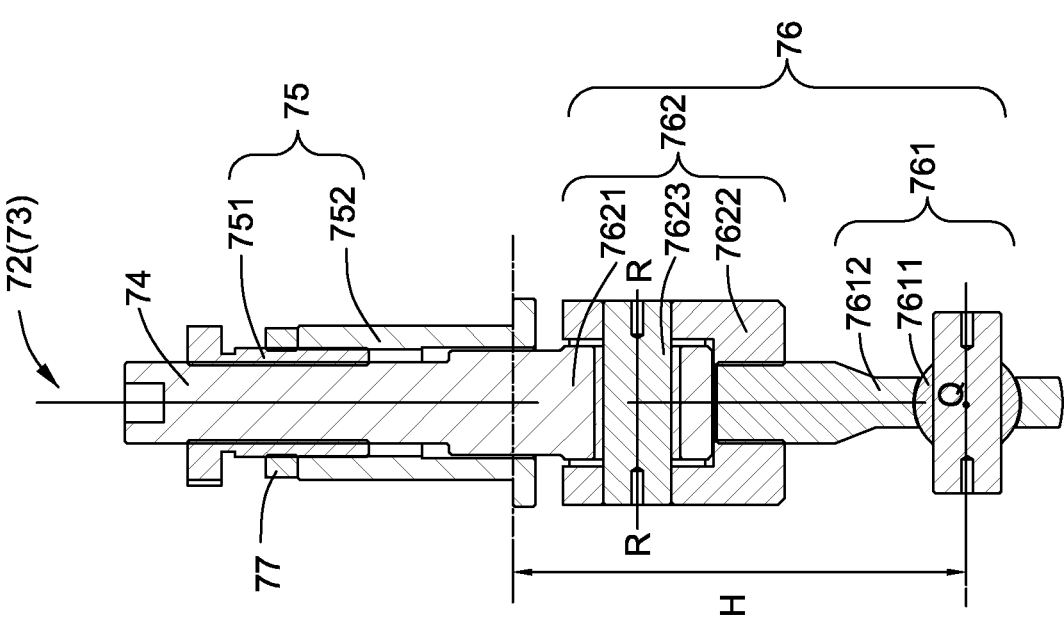
FIG. 16 is a cross-sectional view of an exemplary second/third adjustable foot in accordance with an embodiment of the present disclosure.
Figure 19:
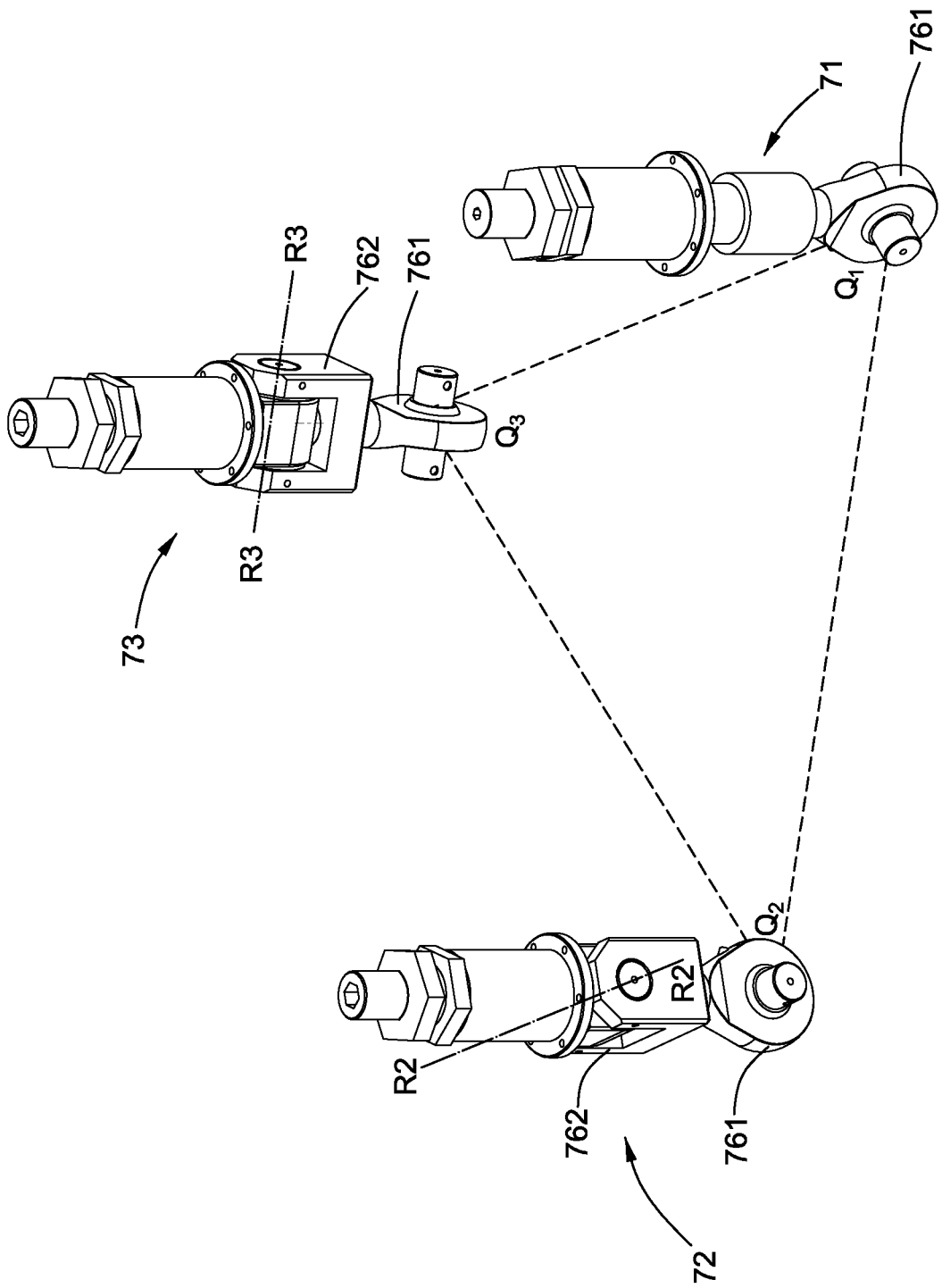
FIG. 19 is a schematic diagram of assembly relationship among the first, the second and the third adjustable feet.

As shown in FIGS. 15-16 and 19, in an embodiment, the first lifting module 21 may comprise a first adjustable foot 71, the second lifting module 22 may comprise a second adjustable foot 72, and the third lifting module 23 may comprise a third adjustable foot 73. The first, the second and the third adjustable feet 71, 72, 73 may be respectively fixed onto the carriage vehicles 26 of the first, the second and the third lifting module 21, 22, 23.

With reference to FIGS. 15 and 16, each of the first, the second and the third adjustable feet 71, 72, 73 may comprise a screw rod 74 and an adjusting nut 75. The screw rods 74 of the first, the second and the third adjustable feet 71, 72, 73 may be respectively coupled to the carriage vehicles 26 of the first, the second and the third lifting modules 21, 22, 23. The adjusting nut 75 has a first nut 751 threaded onto the screw rod 74 and a second nut 752 threaded onto the first nut 751 and fixed onto the supporting module 4. Rotating the first nut 751 may finely adjust the height of the second nut 752 which may finely adjust the height of the supporting module 4. How to adjust the height of the supporting module 4 will be described in detail below.

Figure 18:
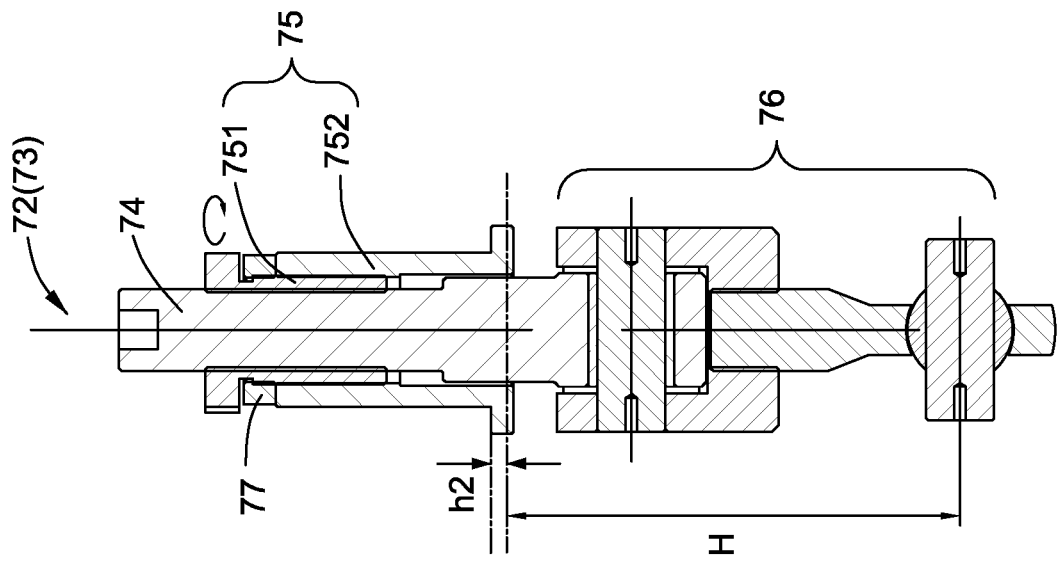
FIG. 18 is a cross-sectional view of the second/third adjustable foot of FIG. 15 in a higher position.
Figure 17:
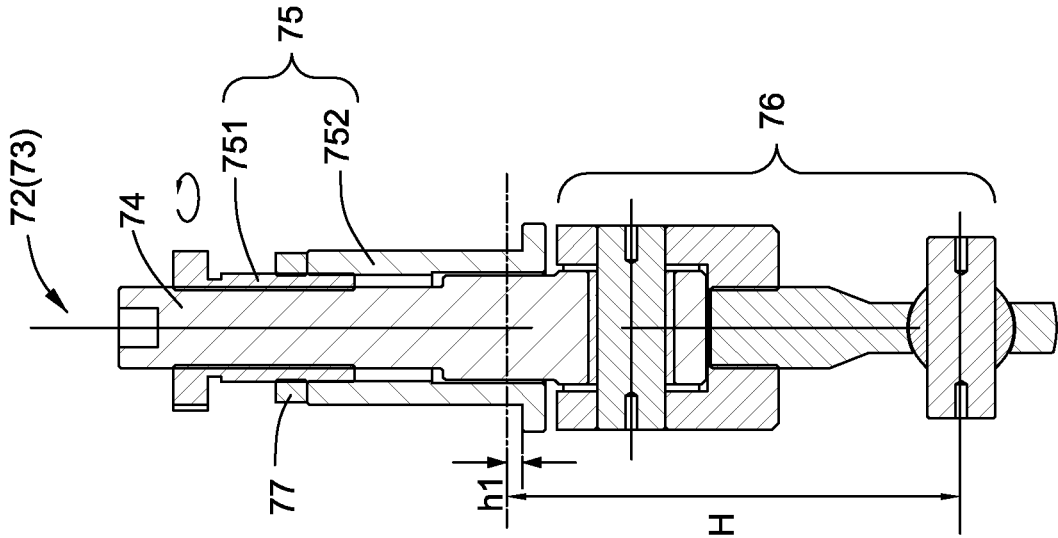
FIG. 17 is a cross-sectional view of the second/third adjustable foot of FIG. 15 in a lower position.

With reference to FIG. 17, when the first nut 751 is rotated around the screw rod 74 along a first direction, for example counterclockwise, the second nut 752 may lower a distance h1 from a height H which may reduce the height of the supporting module 4. With reference to FIG. 18, when the first nut 751 is rotated around the screw rod 74 along a second direction, for example clockwise, the second nut 752 may raise a distance h2 from the height H which may increase the height of the supporting module 4. Thus, by rotating the first nut 751 of the adjustable foot 7, the height of the supporting module 4 may be easily adjusted.

FIGS. 17 and 18 illustrate how to adjust the height of the supporting module 4 by taking an example of the second and the third adjustable feet 72, 73, which may be similarly applied to the first adjustable foot 71.

Each of the first, the second and the third adjustable feet 71, 72, 73 further may comprise a locker nut 77. After the second nut 752 is adjusted to a proper height, the first nut 751 may be secured by the locker nut 77.

For example, when the supporting module 4 is raised and lowered to a certain position, if the supporting module 4 is not in a horizontal state, the supporting module 4 may be positioned into the horizontal state by finely rotating the first nuts 751 of the first, the second and the third adjustable feet 71, 72, 73.

In addition, with reference to FIGS. 15 and 16, each of the first, the second and the third adjustable feet 71, 72, 73 may further comprise a turning joint 76 coupled to the screw rod 74 for increasing flexibility of movement of the supporting module 4. The turning joints 76 of the first, the second and the third adjustable feet 71, 72, 73 may be respectively fixed onto the carriage vehicles 26 of the first, the second and the third lifting modules 21, 22, 23. For example, in an actual operation, when any one of the first, the second and the third lifting modules 21, 22, 23 occurs to deviate, the turning joints 76 of the first, the second and the third adjustable feet 71, 72, 73 may respectively make adaptive adjustments to eliminate the deviation and may thus drive smoothly the supporting module 4 to raise and lower.

In one embodiment, the second adjustable foot 72 may have the same structure as the third adjustable foot 73, but the second and the third adjustable feet 72, 73 may have the different structure from the first adjustable foot 71. In particular, the turning joints 76 of the second and the third adjustable feet 72, 73 may be different from the turning joint 76 of the first adjustable foot 71.

As shown in FIG. 15 in combination with FIG. 19, the turning joint 76 of the first adjustable foot 71 may only comprise a spherical joint 761. The spherical joint 761 may be fixed onto the carriage vehicle 26 and may be fixedly connected with the screw rod 74. The spherical joint 761 has a center of sphere Q and may provide rotational degrees of freedom in the X-axis, Y-axis and Z-axis directions for the first adjustable foot 71. The spherical joint 761 may comprise a ball socket 7611 and a ball rod 7612. The ball socket 7611 may be fixed onto the carriage vehicle 26. One end of the ball rod 7612 may spherically contact with the ball socket 7611 and the other end of the ball rod 7612 may be fixedly connected with the screw rod 74. The ball rod 7612 may rotate about the center of sphere Q in the X-axis, Y-axis and Z-axis directions.

As shown in FIG. 16 in combination with FIG. 19, the turning joint 76 of each of the second and the third adjustable feet 72, 73 may comprise a spherical joint 761 and a hinge joint 762. The spherical joint 761 may be fixed onto the carriage vehicle 26 and the hinge joint 762 may connect the spherical joint 762 with the screw rod 74. The spherical joint 761 has a center of sphere Q and may provide rotational degrees of freedom in the X-axis, Y-axis and Z-axis directions for each of the second and the third adjustable feet 72, 73. The spherical joint 761 may comprise a ball socket 7611 and a ball rod 7612. The ball socket 7611 may be fixed onto the carriage vehicle 26. One end of the ball rod 7612 may spherically contact with the ball socket 7611 and the other end of the ball rod 7612 may be fixedly connected with the hinge joint 762. The ball rod 7612 may rotate about the center of sphere Q in the X-axis, Y-axis and Z-axis directions. The hinge joint 762 has a rotation axis R-R and may provide a rotation about the rotation axis R-R for each of the second and the third adjustable feet 72, 73. The hinge joint 762 may comprise a hinge bracket 7621 and a swing rod 7622. The hinge bracket 7621 may be fixedly connected with the screw rod 74. Alternatively, the hinge bracket 7621 and the screw rod 74 may be integral. The swing rod 7622 may be rotatably connected with the hinge bracket 7621 via a pin 7623 and be fixed onto the ball rod 7612 of the spherical joint 761. Alternatively, the ball rod 7612 and the swing rod 7622 may be integral. The swing rod 7622 may rotate about the pin 7623, i.e. the rotation axis R-R relative to the hinge bracket 7621.

FIG. 19 illustrates a schematic diagram of assembly relationship among the first, the second and the third adjustable feet 71, 72, 73. With reference to FIG. 19, in order to achieve better adaptive adjustments, when the first, the second and the third adjustable feet 71, 72, 73 are assembled onto the carriage vehicle 26 and the supporting module 4, the rotation axis R2-R2 of the hinge joint 762 of the second adjustable foot 72 needs to be at an angle with a connecting line $Q_2Q_3$ between the center of sphere $Q_2$ of the spherical joint 761 of the second adjustable foot 72 and the center of sphere $Q_3$ of the spherical joint 761 of the third adjustable foot 73. In one embodiment, the rotation axis R2-R2 of the hinge joint 762 of the second adjustable foot 72 may be generally in parallel with a connecting line $Q_1Q_3$ between the center of sphere $Q_1$ of the spherical joint 761 of the first adjustable foot 71 and the center of sphere $Q_3$ of the spherical joint 761 of the third adjustable foot 73. Similarly, the rotation axis R3-R3 of the hinge joint 762 of the third adjustable foot 73 also needs to be at an angle with a connecting line $Q_2Q_3$ between the center of sphere $Q_2$ of the spherical joint 761 of the second adjustable foot 72 and the center of sphere $Q_3$ of the spherical joint 761 of the third adjustable foot 73. In one embodiment, the rotation axis R3-R3 of the hinge joint 762 of the third adjustable foot 73 may be generally in parallel with a connecting line $Q_1Q_2$ between the center of sphere $Q_1$ of the spherical joint 761 of the first adjustable foot 71 and the center of sphere $Q_2$ of the spherical joint 761 of the second adjustable foot 72.

Figure 20:
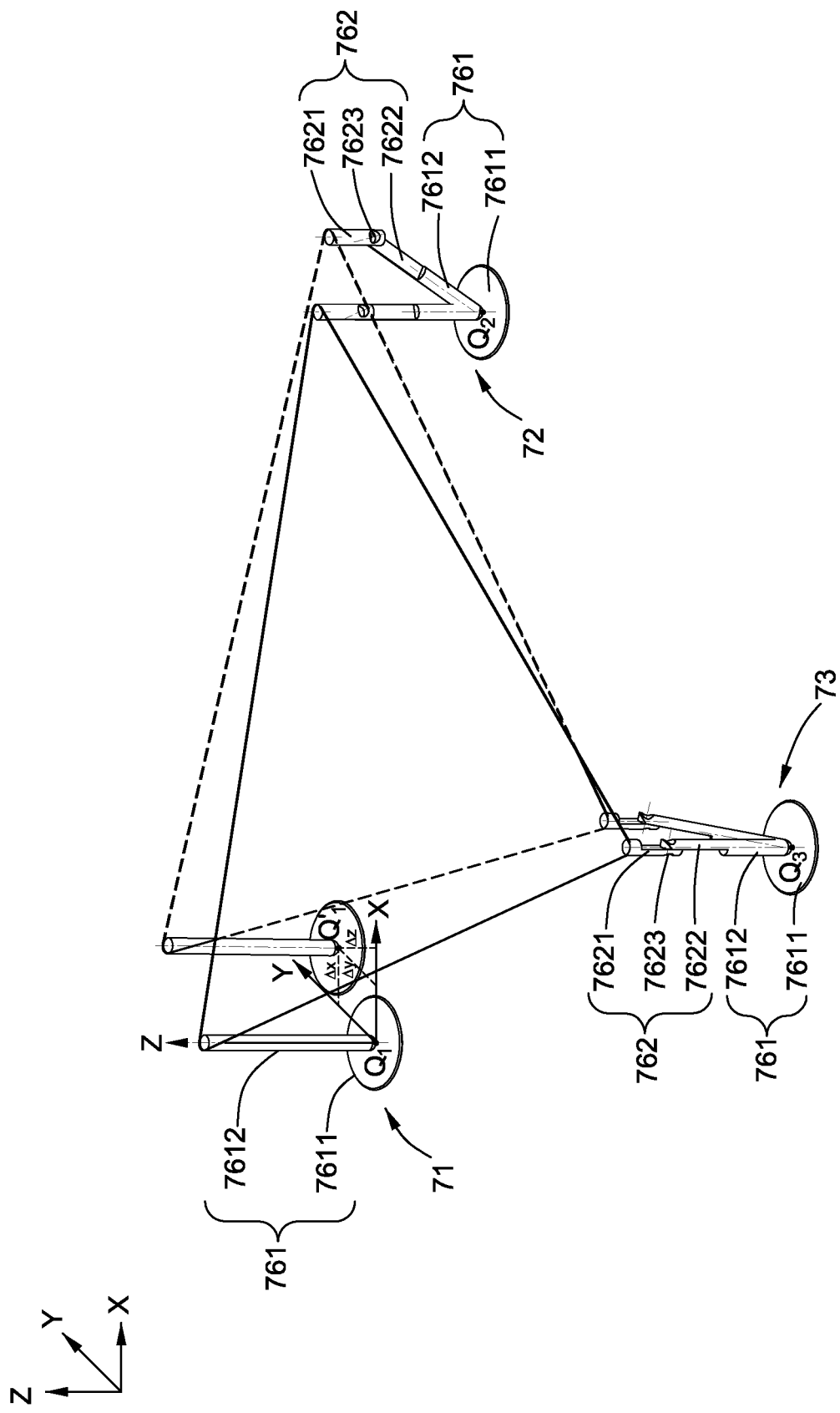
FIG. 20 is a simplified status diagram of adaptive adjustment of the first, the second and the third adjustable feet under deviation of the first adjustable foot.
Figure 21:
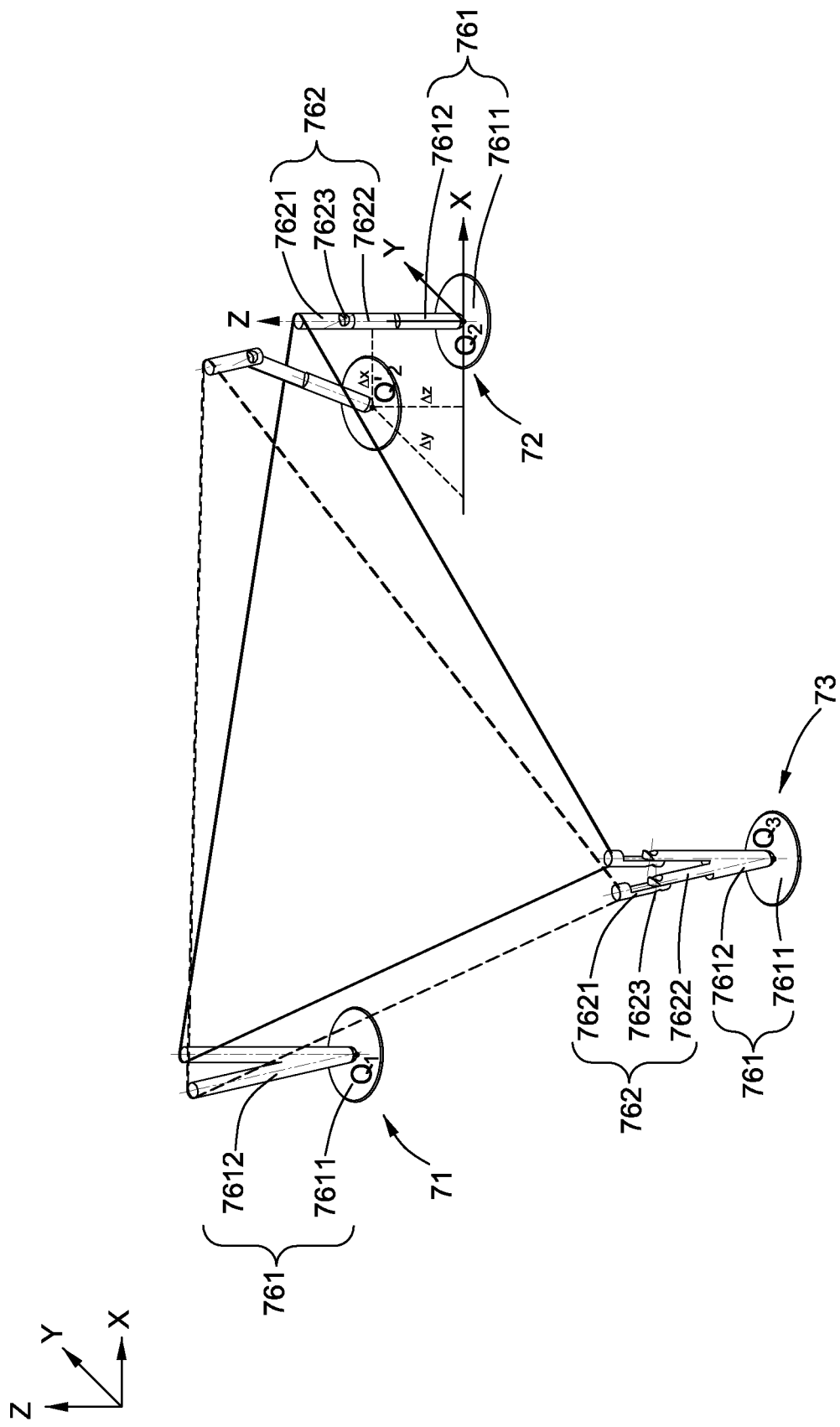
FIG. 21 is a simplified status diagram of adaptive adjustment of the first, the second and the third adjustable feet under deviation of the second adjustable foot.

FIG. 20 illustrates a schematic status diagram of adaptive adjustment of the first, the second and the third adjustable feet 71, 72, 73 under deviation of the first adjustable foot 71 and FIG. 21 illustrates a schematic status diagrams of adaptive adjustment of the first, the second and the third adjustable feet 71, 72, 73 under deviation of the second adjustable feet 72. Because FIGS. 20 and 21 are only for explaining functions of the turning joints 76 of the first, the second and the third adjustable feet 71, 72, 73, the turning joints 76 of the first, the second and the third adjustable feet 71, 72, 73 are only simply shown in FIGS. 20 and 21 without showing the adjusting nuts 75 of the first, the second and the third adjustable feet 71, 72, 73.

Referring to FIG. 20, during the movement of the supporting module 4 driven by the first, the second, and the third lifting modules 21, 22, 23, if the first lifting module 21 occurs to deviate in one or more of the X-axis, Y-axis and Z-axis directions, resulting in corresponding deviation of the first adjustable foot 71, for example, when the center of sphere $Q_1$ of the spherical joint 761 of the first adjustable foot 71 deviates to $Q_1'$, that is, the center of sphere $Q_1$ of the first adjustable foot 71 has the deviation $\Delta x$ in the X-axis direction, the deviation $\Delta y$ in the Y-axis direction and the deviation $\Delta z$ in the Z-axis direction, the spherical joint 761 of the first adjustable foot 71, the spherical joint 761 and the hinge joint 762 of the second adjustable foot 72, and the spherical joint 761 and the hinge joint 762 of the third adjustable foot 73 may respectively make adaptive adjustments according to the deviations $\Delta x$, $\Delta y$, $\Delta z$ and find a stable status (as shown in dashed lines of FIG. 20) so as to eliminate the deviations $\Delta x$, $\Delta y$, $\Delta z$, which may make the movement of the supporting module 4 not stuck due to the deviation of the first lifting module 21. Thus, the supporting module 4 may be smoothly driven to raise and lower.

Referring to FIG. 21, during the movement of the supporting module 4 driven by the first, the second, and the third lifting modules 21, 22, 23, if the second lifting module 22 occurs to deviate in one or more of the X-axis, Y-axis and Z-axis directions, resulting in corresponding deviation of the second adjustable foot 72, for example, when the center of sphere $Q_2$ of the spherical joint 761 of the second adjustable foot 72 deviates to $Q_2'$, the spherical joint 761 of the first adjustable foot 71, the spherical joint 761 and the hinge joint 762 of the second adjustable foot 72, and the spherical joint 761 and the hinge joint 762 of the third adjustable foot 73 may respectively make adaptive adjustments according to the deviation $\Delta x$ in the X-axis direction, the deviation $\Delta y$ in the Y-axis direction and the deviation $\Delta z$ in the Z-axis direction and find a stable status (as shown in dashed lines of FIG. 21) so as to eliminate the deviations $\Delta x$, $\Delta y$, $\Delta z$, which may make the movement of the supporting module 4 not stuck due to the deviation of the second lifting module 22. Thus, the supporting module 4 may be smoothly driven to raise and lower.

Similarly, when the third lifting module 23 occurs to deviate in one or more of the X-axis, Y-axis and Z-axis directions, resulting in corresponding deviation of the third adjustable foot 73, the spherical joint 761 of the first adjustable foot 71, the spherical joint 761 and the hinge joint 762 of the second adjustable foot 72, and the spherical joint 761 and the hinge joint 762 of the third adjustable foot 72 may respectively make adaptive adjustments to eliminate the deviation.

The spherical joint 761 of the first adjustable foot 71, the spherical joint 761 and the hinge joint 762 of the second adjustable foot 72, and the spherical joint 761 and the hinge joint 762 of the third adjustable foot 73 of the present disclosure may adapt to the deviations of one or more of the first, the second and the third lifting modules 21, 22, 23 and thus increase flexibility of movement of the supporting module 4.

Figure 22:
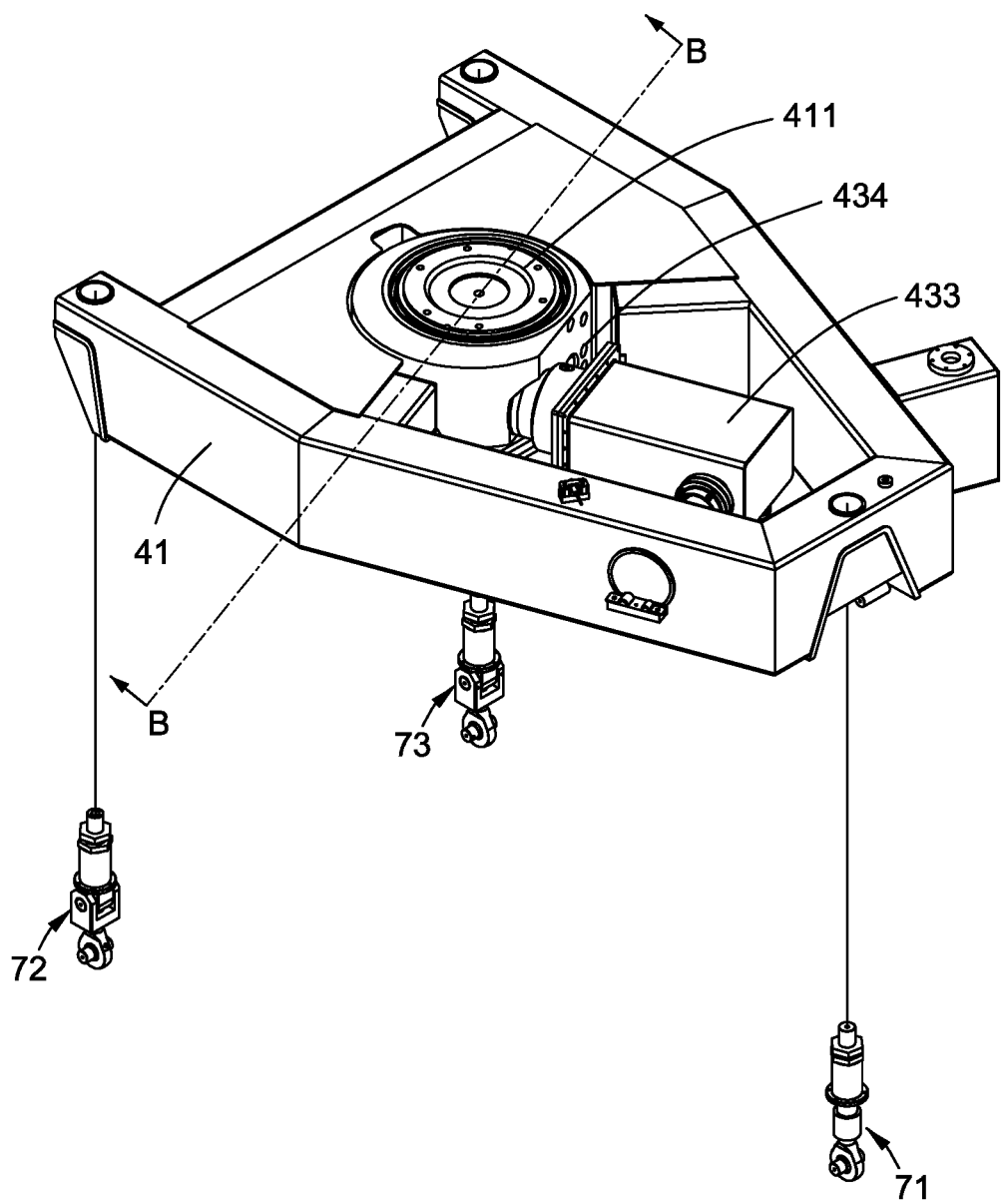
FIG. 22 is a schematic diagram of an exemplary rotation table and the first, the second and the third adjustable feet.
Figure 23:
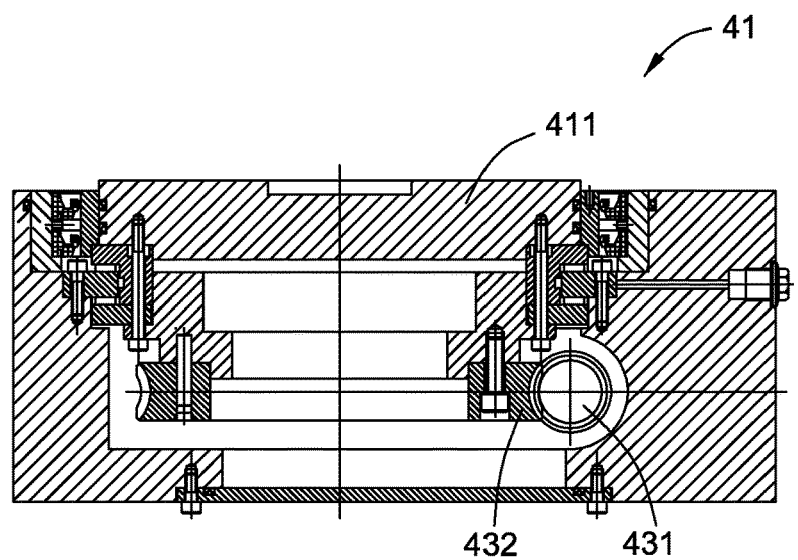
FIG. 23 is a cross-sectional view of the rotation table of FIG. 22 taken along line B-B.

Referring to FIGS. 22-23 in conjunction with FIGS. 1-2, the supporting module 4 may comprise a rotation table 41 and a chuck module 42 which may be rotatably coupled to the rotation table 41. The second nuts 752 of the first, second and the third adjustable feet 71, 72, 73 may be fixed onto the rotation table 41 of the supporting module 4.

In an embodiment of the present disclosure, a worm gear driving mechanism may be disposed inside the rotation table 41 which may drive the chuck module 42 to rotate, although other drive mechanisms are also contemplated. The worm gear driving mechanism may comprise a worm 431, a worm gear 432 engaged with the worm 431, a motor 433 and a shaft coupling 434. The motor 433 may be coupled to the worm 431 via the shaft coupling 434 for driving the worm 431 and the worm gear 432. The worm gear 432 may be coupled to a rotation disc 411 of the rotation table 41 and the rotation disc 411 may be driven to rotate upon the driving force of the motor 433. The rotation disc 411 may be engaged to the chuck module 42, so that the rotation disc 411 may rotate the chuck module 42.

As shown in FIGS. 1-3, in the lifting apparatus 100 of embodiments of the present disclosure, in order to accurately identify the first position and the second position of the supporting module 4, at least one of the plurality of lifting modules 21, 22, 23 may comprise a first position sensor 81 for sensing the first position of the supporting module 4 and a second position sensor 82 for sensing the second position of the supporting module 4. Correspondingly, a metal sheet 261 may be disposed on the carriage vehicle 26 of the at least one of the plurality of lifting modules 21, 22, 23. The carriage vehicle 26 may allow the metal sheet 261 to raise and lower. By sensing a position of the metal sheet 261, the first/second position sensors 81, 82 may sense a position of the supporting module 4.

Figure 24:
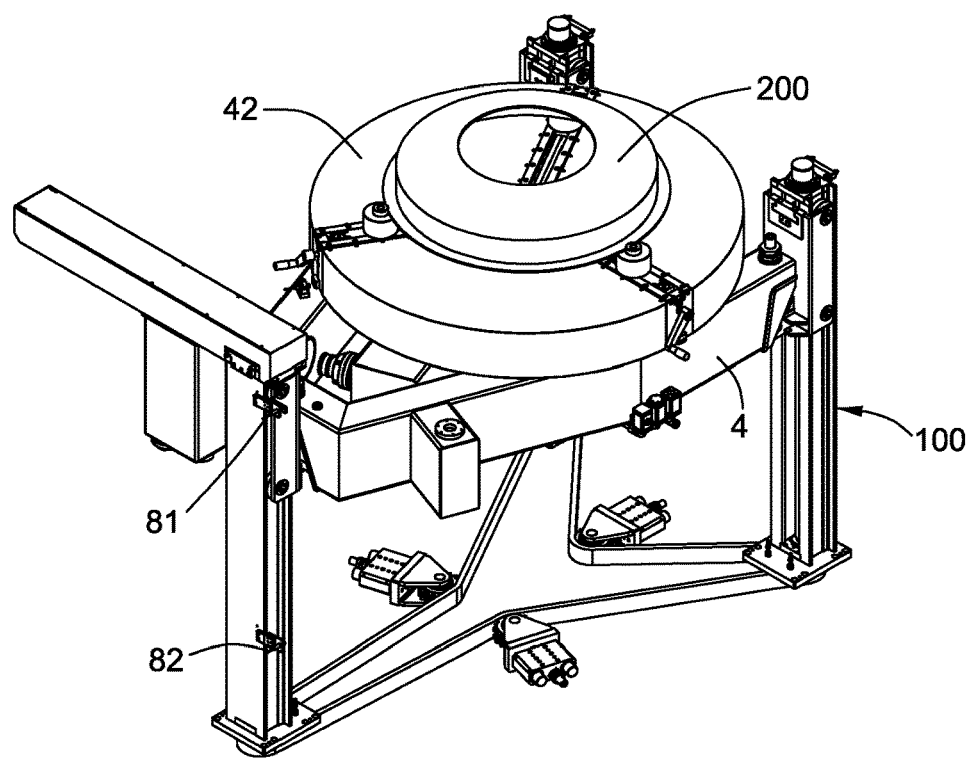
FIG. 24 is a schematic diagram of an ultrasonic inspection system in an exemplary loading/unloading position in accordance with an embodiment of the present disclosure.
Figure 25:
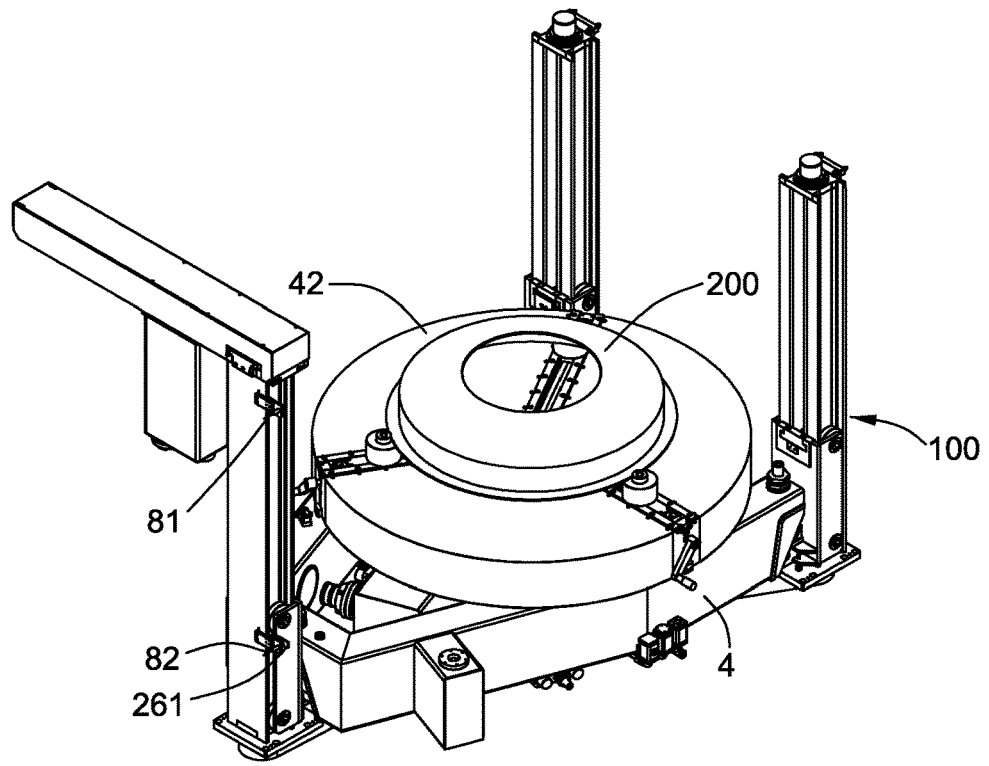
FIG. 25 is a schematic diagram of the ultrasonic inspection system of FIG. 24 in an exemplary inspecting position.
Figure 26:
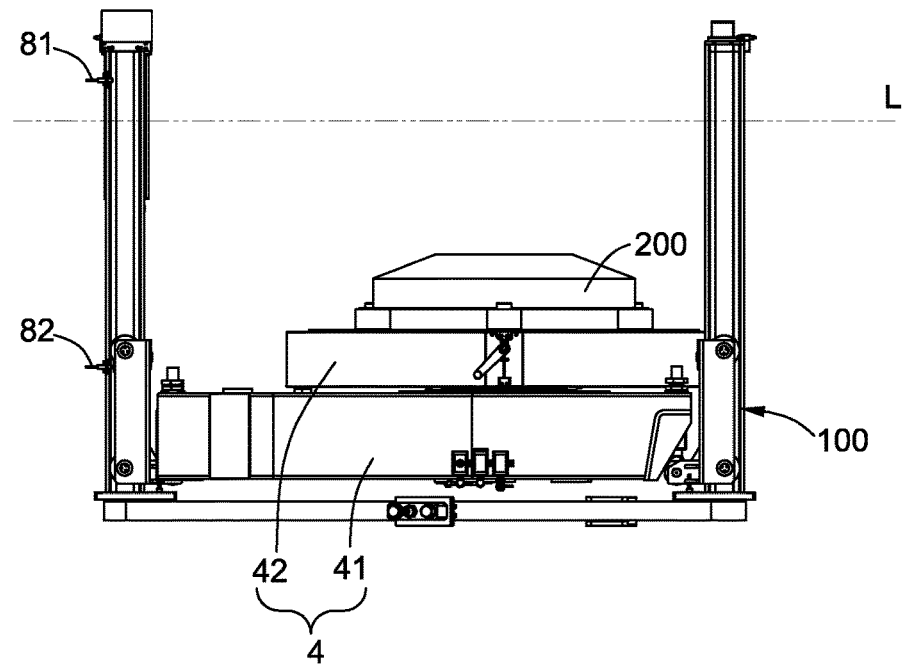
FIG. 26 is a front view of the ultrasonic inspection system of FIG. 25.

The lifting apparatus 100 of the embodiments of the present disclosure may be applied to an ultrasonic inspection system for inspection a condition of a workpiece 200, as shown in FIGS. 24-26. Generally, the workpiece 200 may be partially or completely immersed in a liquid medium (such as water or oil, which is indicated by a dashed line L in FIG. 26). The workpiece shown in FIGS. 24-26 is exemplary and may be a vehicle wheel (e.g. a railway wheel), a turbine motor blade, a steel plate, an aluminum plate, a steel pipe, and the like. The ultrasonic inspection system in accordance with one embodiment of the present disclosure may comprise at least one ultrasonic probe (not shown in FIGS. 24-26) and the lifting apparatus 100 of the above embodiments. The workpiece 200 may be positioned on the supporting module 4 of the lifting apparatus 100, particularly the chuck module 42 of the supporting module 4. The lifting apparatus 100 may support the workpiece 200 and may drive the supporting module 4 to raise and lower the workpiece 200 to locate the workpiece a suitable position, for example, a first position shown in FIG. 24 or a second position shown in FIG. 25. The first position may be for example a loading/uploading position. When the supporting module 4 is raised by the lifting apparatus 100 to the first position, the workpiece 200 may be placed on the chuck module 41 of supporting module 4 or the workpiece 200 may be unloaded from chuck module 41 of supporting module 4. The second position may be for example an inspecting position. After the workpiece 200 is placed on the chuck module 41 of supporting module 4, the supporting module 4 may be lowered by the lifting apparatus 100 from the first position to the second position. When the workpiece 200 is lowered to the second position, the at least one ultrasonic probe can be conveniently used to perform ultrasonic inspection of the workpiece 200. An ultrasonic wave transmitted by the at least one ultrasonic probe may be transmitted to the workpiece 200 via the liquid medium, and a return ultrasonic wave reflected by the workpiece 200 may be received by the at least one ultrasonic probe via the liquid medium. The received return ultrasonic wave may then be processed, using conventional image processing techniques. Thereafter, review of the processed image of the workpiece 200 may be performed to determine whether a flaw (e.g. a break, a crack, and a bubble) exists on the workpiece 200.

What is claimed is:

1. A lifting apparatus, comprising:
   a power driving module for providing a driving force;
   a plurality of lifting modules for raising and lowering a supporting module upon action of the driving force, wherein the supporting module includes:
   a rotation table, and
   a chuck module rotatably coupled to the rotation table, wherein a worm gear driving mechanism is disposed inside the rotation table to drive the chuck module to rotate; and
   a transmission module located under the supporting module for transmitting the driving force to at least one of the plurality of lifting modules.

2. The lifting apparatus of claim 1, wherein the transmission module comprises:
   a roller chain engaged to the at least one lifting module; and
   at least one tension adjusting unit engaged to the roller chain for self-adjusting a tension of the roller chain when the tension of the roller chain is changed.

3. The lifting apparatus of claim 1, wherein the plurality of lifting modules comprise a first lifting module, a second lifting module and a third lifting module, the power driving module provides the driving force to the first lifting module, and the transmission module is coupled to the first lifting module and transmits the driving force to the second lifting module and the third lifting module.

4. The lifting apparatus of claim 3, wherein the transmission module comprises:
   a first roller coupled to the first lifting module;
   a second roller coupled to the second lifting module;
   a third roller coupled to the third lifting module;
   a roller chain surrounding the first roller, the second roller and the third roller; and at least one tension adjusting unit engaged to the roller chain for self-adjusting a tension of the roller chain when the tension of the roller chain is changed.

5. The lifting apparatus of claim 4, wherein the at least one tension adjusting unit comprises:
a first tension adjusting unit engaged to the roller chain between the first and the second lifting modules;
a second tension adjusting unit engaged to the roller chain between the first and the third lifting modules; and
a third tension adjusting unit engaged to the roller chain between the second and the third lifting modules, wherein
the first, the second and the third tension adjusting units are able to pretension the roller chain when the lifting apparatus is in a non-operating state; and
the first and the second tension adjusting units are able to self-adjust the tension of the roller chain in opposing directions when the lifting apparatus is in an operating state.

6. The lifting apparatus of claim 2, wherein the at least one tension adjusting unit comprises:
a movable member;
a fixed member; and
a resilient member positioned between the movable member and the fixed member, wherein
the movable member is engaged to the roller chain to pretension the roller chain upon action of resilient force of the resilient member when the lifting apparatus is in a non-operating state, and
the movable member is able to move relative to the fixed member upon the action of resilient force of the resilient member when the lifting apparatus is in an operating state and the tension of the roller chain is changed.

7. The lifting apparatus of claim 6, wherein when the tension of the roller chain becomes lesser, the resilient member pushes the movable member in a direction toward the roller chain so as to increase the tension of the roller chain, and when the tension of the roller chain becomes greater, the resilient member pulls the movable member in a direction away from the roller chain so as to reduce the tension of the roller chain.

8. The lifting apparatus of claim 6, wherein the fixed member has a passage, and the movable member comprises a housing, a roller rotatably coupled to the housing and meshed with the roller chain, and a sliding rod, and wherein a first end of the sliding rod is fixed onto the housing and a second end of the sliding rod extends beyond the passage and is slidable within the passage upon the action of resilient force of the resilient member.

9. The lifting apparatus of claim 8, wherein the fixed member further comprises a sleeve pressed against one end of the resilient member and the other end of the resilient member is fixed onto the housing, and wherein the sleeve is detachably fixed within the passage and the sliding rod is slidable within the sleeve.

10. The lifting apparatus of claim 9, wherein the sleeve is so fixed that the resilient member is compressed and provides a pretension to allow the roller to mesh with the roller chain when the lifting apparatus is in the non-operating state.

11. The lifting apparatus of claim 6, wherein the at least one tension adjusting unit further comprises:
a guiding member for guiding the movable member to move relative the fixed member.

12. The lifting apparatus of claim 1, wherein at least one of the plurality of lifting modules comprises:
a positioned screw rod;
a nut;
a carriage vehicle for raising and lowering the supporting module; and
a nut fixed member comprising a first cylinder fixed onto the nut and a second cylinder, wherein
when the screw rod is driven to rotate upon the action of the driving force, the screw rod is able to cause the nut and the nut fixed member to move, and
the second cylinder is positioned within the carriage vehicle to allow the nut fixed member and the carriage vehicle to move and the nut is able to rotate about a vertical direction and is able to move along a connecting line direction between axes of the first and the second cylinders.

13. The lifting apparatus of claim 12, wherein the at least one lifting module further comprises:
a guide pillar, wherein the carriage vehicle is movable along the guide pillar.

14. The lifting apparatus of claim 12, wherein the at least one lifting module further comprises:
a pair of floating blocks positioned at opposite sides of the second cylinder in a rotatable contacting manner and able to move together with the nut fixed member along the connecting line direction.

15. The lifting apparatus of claim 14, wherein the carriage vehicle comprises a chamber, and the second cylinder and the pair of floating blocks are restricted in the chamber along the vertical direction Z by a press block which is fixed onto the carriage vehicle.

16. The lifting apparatus of claim 15, wherein the at least one lifting module further comprises:
a damping member attached to an end of the second cylinder for damping vibration of the nut.

17. The lifting apparatus of claim 1, wherein at least one of the plurality of lifting modules comprises:
an adjustable foot connected to the supporting module for supporting the supporting module and able to finely adjust a height of the supporting module in a stationary status.

18. The lifting apparatus of claim 17, wherein the adjustable foot comprises:
a screw rod; and
an adjusting nut having a first nut threaded onto the screw rod and a second nut threaded onto the first nut and fixed onto the supporting module, wherein
when the first nut is rotated around the screw rod along a first direction, the second nut is able to raise so as to increase the height of the supporting module, and
when the first nut is rotated around the screw rod along a second direction, the second nut is able to lower so as to reduce the height of the supporting module.

19. The lifting apparatus of claim 18, wherein the adjustable foot further comprises:
a turning joint connecting the screw rod with the at least one lifting module for increasing flexibility of movement of the supporting module.

20. The lifting apparatus of claim 19, wherein the plurality of lifting modules comprise a first lifting module, a second lifting module and a third lifting module, the adjustable foot comprise a first adjustable foot of the first lifting module, a second adjustable foot of the second lifting module and a third adjustable foot of the third lifting module, and the turning joint of the second adjustable foot is the same as the turning joint of the third adjustable foot and is different from the turning joint of the first adjustable foot.

21. The lifting apparatus of claim 20, wherein the turning joint of the first adjustable foot comprises a spherical joint for providing rotational degrees of freedom in the X-axis, Y-axis and Z-axis directions for the first adjustable foot, and the turning joint of each of the second and the third adjustable feet comprises a spherical joint providing rotational degrees of freedom in the X-axis, Y-axis and Z-axis directions for each of the second and the third adjustable feet and a hinge joint having a rotation axis and providing a rotation about the rotation axis for each of the second and the third adjustable feet.

22. The lifting apparatus of claim 21, wherein the rotation axes of the hinge joints of the second and the third adjustable feet are at an angle with a connecting line between a center of sphere of the spherical joint of the second adjustable foot and a center of sphere of the spherical joint of the third adjustable foot.

23. The lifting apparatus of claim 21, wherein the rotation axis of the hinge joint of the second adjustable foot is generally in parallel with a connecting line between a center of sphere of the spherical joint of the first adjustable foot and a center of sphere of the spherical joint of the third adjustable foot and the rotation axis of the hinge joint of the third adjustable foot is generally in parallel with a connecting line between the center of sphere of the spherical joint of the first adjustable foot and a center of sphere of the spherical joint of the second adjustable foot.

24. An ultrasonic inspection system, comprising:
at least one ultrasonic probe; and
the lifting apparatus as claimed in claim 1 for raising and lowering a workpiece at least partly immersed in a liquid to a suitable position for inspection of the workpiece by the at least one ultrasonic probe, wherein the workpiece is positioned on the supporting module of the lifting apparatus.

* * * * *